(12) United States Patent
Ikeda et al.

(10) Patent No.: US 6,425,042 B1
(45) Date of Patent: Jul. 23, 2002

(54) TAPE DRIVE APPARATUS FOR JUDGING AN OPERATIONAL MODE OF THE TAPE BASED ON DETECTED TAPE MANAGEMENT INFORMATION

(75) Inventors: Katsumi Ikeda; Masaki Yoshida; Hideto Suzuki; Yoshihisa Takayama; Tatsuya Kato; Osamu Nakamura; Hironori Miyoshi, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/357,835

(22) Filed: Jul. 21, 1999

(30) Foreign Application Priority Data

Jul. 24, 1998 (JP) ............................................. 10-209233

(51) Int. Cl.⁷ ............................................. G06F 12/00
(52) U.S. Cl. ............................. 711/4; 711/173; 711/111; 360/69
(58) Field of Search ................................. 711/111, 173, 711/4; 710/74; 360/40–72.3

(56) References Cited

U.S. PATENT DOCUMENTS

| | | | | |
|---|---|---|---|---|
| 5,522,090 A | * | 5/1996 | Tanaka et al. | 710/74 |
| 5,940,232 A | * | 8/1999 | Okuyama | 360/15 |
| 6,038,366 A | * | 3/2000 | Ohno et al. | 386/46 |
| 6,182,191 B1 | * | 1/2001 | Fukuzono et al. | 711/111 |

* cited by examiner

Primary Examiner—Do Hyun Yoo
Assistant Examiner—Nasser Moazzami
(74) Attorney, Agent, or Firm—Jay H. Maioli

(57) ABSTRACT

When a tape cassette is mounted, a tape drive apparatus judges whether the tape cassette is of a first mode (normal mode) or a second mode (multi-partition mode) based on one or both of management information that is read out from the magnetic tape and management information that is read out from a memory (MIC) incorporated in the tape cassette. The tape drive apparatus then an performs an operation setting in accordance with the mode thus judged.

7 Claims, 32 Drawing Sheets

ID STRUCTURE

PHYSICAL BLOCK ADDRESS NUMBERS OF ON A TRACK

FIG. 10

ID AREA INFORMATION

| RAW FORMAT ID | | 16 BITS |
|---|---|---|
| LOGICAL FORMAT ID | | 8 BITS |
| LOGICAL FRAME ID | LAST FRAME ID | 1 BITS |
| | ECC FRAME ID | 1 BITS |
| | LOGICAL FRAME NUMBER | 6 BITS |
| PARTITION ID | | 16 BITS |
| AREA ID | | 4 BITS |
| DATA ID | | 4 BITS |
| N – POSITION | | 4 BITS |
| N – REPEATS | | 4 BITS |
| GROUP COUNT | | 24 BITS |
| FILE – MARK COUNT | | 32 BITS |
| SAVE – SET MARK COUNT | | 32 BITS |
| RECORD COUNT | | 32 BITS |
| ABSOLUTE FRAME COUNT | | 24 BITS |
| RESERVED | | |

FIG. 11

AREA ID DEFINITIONS

| BIT 3210 | DEFINITION |
|---|---|
| 0000 (0) | DEVICE AREA |
| 0001 (1) | REFERENCE AREA |
| 0010 (2) | SYSTEM AREA |
| 0011 (3) | RESERVED |
| 0100 (4) | DATA AREA |
| 0101 (5) | EDD AREA |
| 0110 (6) | RESERVED |
| 0111 (7) | OPTION DEVICE AREA |

FIG. 13

VOLUME INFORMATION OF MIC

| | |
|---|---|
| EJECT STATUS | 20 BYTE |
| REEL DIAMETER | 4 BYTE |
| INITIALIZE COUNT | 3 BYTE |
| RAW FORMAT ID | 2 BYTE |
| DSS MODE | 1 BIT |
| ULPBOT | 1 BIT |
| SYS LOG ALIVE | 2 BIT |
| LAST PARTITION MUNBER | 1 BYTE |
| DEVICE AREA MAP | ARRAY [0...255] OF BIT |

FIG. 14 (A)

VOLUME INFORMATION ON TAPE

| RAW FORMAT ID | 2 BYTE |
|---|---|
| DDS MODE | 1 BIT |
| ULPBOT | 1 BIT |
| SYS LOG ALIVE | 2 BIT |
| LAST PARTITION NUMBER | 1 BYTE |
| DEVICE AREA MAP | ARRAY [0...255] OF BIT |

FIG. 14 (B)

PARTITION LOGS ON TAPE

| PREVIOUS GROUPS WRITTEN |
|---|
| TOTAL GROUPS WRITTEN |
| PREVIOUS GROUPS READ |
| TOTAL GROUPS READ |
| TOTAL REWRITTEN FRAME |
| TOTAL 3RD ECC COUNT |
| ACCESS COUNT |
| UPDATE REPLACE COUNT |
| PREVIOUS REWRITTEN FRAMES |
| PREVIOUS 3RD ECC COUNT |
| ID MAP NUMBER |
| LOAD COUNT |
| VALID MAX. ABSOLUTE FRAME COUNT |
| FLAGE |
| MAX. ABSOLUTE FRAME COUNT |

FIG. 15 (A)

MODE SETTING COMMAND

| BIT<br>BYTE | 7 | 6 | 5 | 4 | 3 | 2 | 1 | 0 |
|---|---|---|---|---|---|---|---|---|
| 0 | RESERVED | | | | PAGE CODE (31h) | | | |
| 1 | PAGE LENGTH (8) | | | | | | | |
| 2 | AIT | DEVICE | ABS | ULPBOT | RESERVED | | SYS LOG ALIVE | |
| 3 | | | | | SPAN (0Ah) | | | |
| 4 | MIC | | RESERVED | | | | | |
| 5 | RESERVED | | | | | | | |
| 6 | RESERVED | | | | | | | |
| 7 | RESERVED | | | | | | | |
| 8 | RESERVED | | | | | | | |
| 9 | RESERVED | | | | | | | |

FIG. 15 (B)

| BITS | CONTENTS |
|---|---|
| AIT | 0: NORMAL MODE (DDS)<br>1: MULTI-PARTITION MODE (AIT) |
| DEVICE | 0: DO NOT FORM OPTIONAL DEVICE AREA<br>1: FORM OPTIONAL DEVICE AREA |
| ABS | 0: DO NOT GENERATE ABSOLUTE VOLUME MAP INFORMATION<br>1: GENERATE ABSOLUTE VOLUME MAP INFORMATION |
| ULPBOT | 0: LOADING AND UNLOADING IS PERMITTED AT OPTIONAL DEVICE AREA<br>1: LOADING AND UNLOADING IS INHIBITED AT OPTIONAL DEVICE AREA |
| SYS LOG ALIVE | 00: FORM SYSTEM AREAS ONLY ON TAPE<br>11: FORM SYSTEM AREAS IN MIC AND ON TAPE |

FIG. 16

| | AIT | DEVICE | ABS | ULPBOT | RESERVED | SYS LOG ALIVE |
|---|---|---|---|---|---|---|
| ① | 0 | 0 | 0 | 1 | 00 | 00 |
| ② | 0 | 0 | 1 | 1 | 00 | 11 |
| ③ | 1 | 1 | 1 | 1 | 00 | 11 |
| ④ | 1 | 1 | 1 | 0 | 00 | 11 |

①② NORMAL MODE
③④ MULTI-PARTITION MODE

FIG. 18

FORMATTING COMMAND

| BIT BYTE | 7 | 6 | 5 | 4 | 3 | 2 | 1 | 0 |
|---|---|---|---|---|---|---|---|---|
| 0 | PS (0) | RESERVED | PAGE CODE (11h) | | | | | |
| 1 | PAGE LENGTH (08h – 88h) | | | | | | | |
| 2 | MAXIMUM ADDITIONAL PARTITIONS | | | | | | | |
| 3 | ADDITIONAL PARTITIONS DEFINED | | | | | | | |
| 4 | FDP (0) | SDP (0) | IDP (1) | PSUM (10b) | | RESERVED | | |
| 5 | MEDIUM FORMAT RECOGNITION (03h) | | | | | | | |
| 6 | RESERVED | | | | | | | |
| 7 | RESERVED | | | | | | | |
| 8 | (MSB) | | | | | | | |
| 9 | | | | | | | | (LSB) PARTITION SIZE (PARTITION #0) |
| 10 | (MSB) | | | | | | | |
| 11 | | | | | | | | (LSB) PARTITION SIZE (PARTITION #1) |
| ... | ........ | | | | | | | |
| 134 | (MSB) | | | | | | | |
| 135 | | | | | | | | (LSB) PARTITION SIZE (PHYSICAL & LOGICAL PARTITIONS #63) |

FIG. 25

APPEND PARTITION COMMAND

| BIT<br>BYTE | 7 | 6 | 5 | 4 | 3 | 2 | 1 | 0 |
|---|---|---|---|---|---|---|---|---|
| 0 | RESERVED | | | | PAGE CODE (32h) | | | |
| 1 | PAGE LENGTH (8) | | | | | | | |
| 2 | RESERVED | | | | | | | |
| 3 | RESERVED | | | | | | | |
| 4 | RESERVED | | | PSUM (10b) | | RESERVED | | |
| 5 | RESERVED | | | | | | | |
| 6 | RESERVED | | | | | PARTITION UNITS | | |
| 7 | RESERVED | | | | | | | |
| 8 | (MSB) PARTITION SIZE DESCRIPTOR | | | | | | | |
| 9 | | | | | | | | (LSB) |

FIG. 27

DELETE PARTITION COMMAND

| BIT<br>BYTE | 7 | 6 | 5 | 4 | 3 | 2 | 1 | 0 |
|---|---|---|---|---|---|---|---|---|
| 0 | RESERVED |||||| | |
| 1 | PAGE CODE (33h) ||||||||
| 2 | PAGE LENGTH (8) ||||||||
| 3 | INDICATE PARTITION NUMBER ||||||||
| 4 | RESERVED ||||||||
| 5 | RESERVED ||||||||
| 6 | RESERVED ||||||||
| 7 | RESERVED ||||||||
| 8 | RESERVED ||||||||
| 9 | RESERVED ||||||||

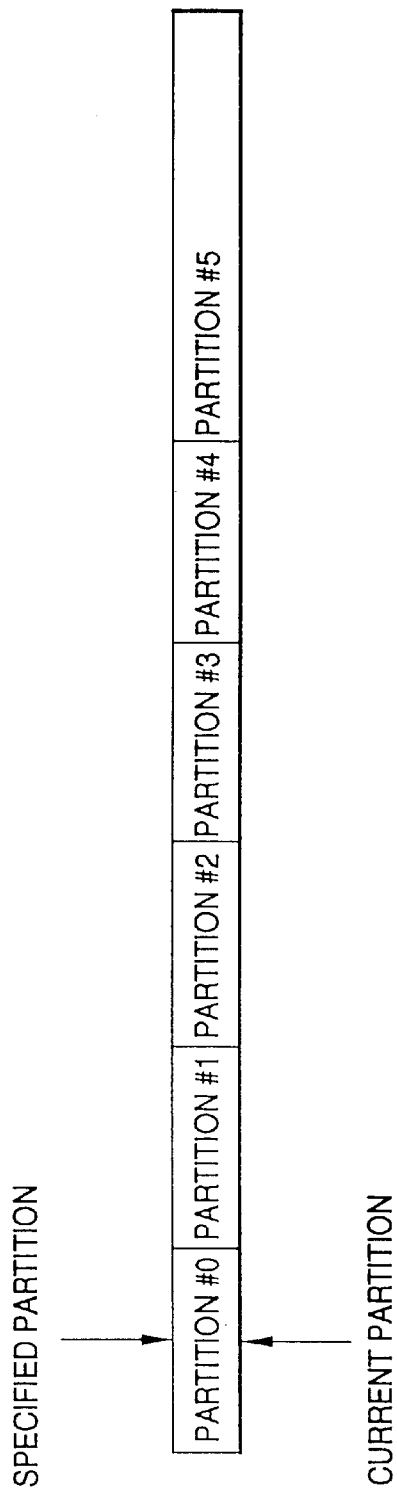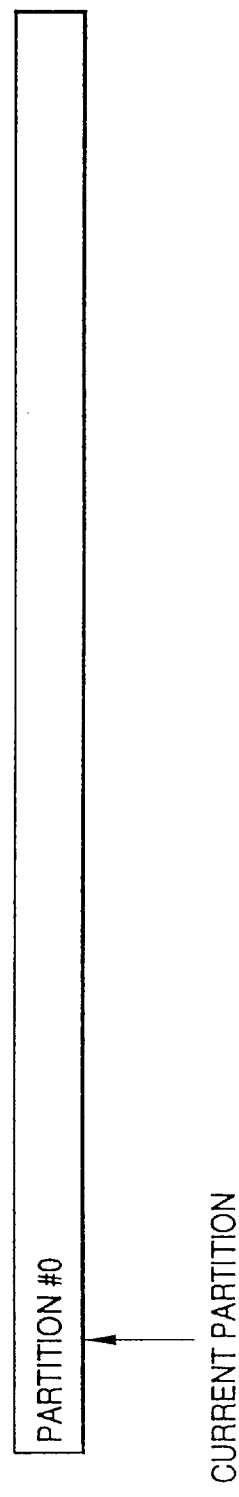
FIG. 31 (A)
FIG. 31 (B)

TAPE DRIVE APPARATUS FOR JUDGING AN OPERATIONAL MODE OF THE TAPE BASED ON DETECTED TAPE MANAGEMENT INFORMATION

BACKGROUND OF THE INVENTION

1. Field of the Invention

The present invention relates to a tape drive apparatus corresponding to a tape cassette that is used for data storage, for example.

2. Description of the Related Art

What is called the tape streamer drive is known as a drive apparatus capable of recording and reproducing digital data on and from a magnetic tape. This tape streamer drive can have an enormous recording capacity of about tens to hundreds of gigabytes, for example, though it depends on the tape length of a tape cassette as a medium. Therefore, this tape streamer drive is widely used for such purposes as backing up data that is recorded on a medium such as a hard disk of a computer main body. Further, this tape streamer drive is considered suitable for storage of, for example, image data having a large data size.

For example, a tape streamer drive of the above type is proposed which records and reproduces data by using an 8 mm VTR tape cassette as a recording medium and employing helical scanning by a rotary head.

For example, the above tape streamer drive using an 8 mm VTR tape cassette employs the SCSI (small computer system interface) as an input/output interface for recorded or reproduced data.

At the time of recording, data supplied from a host computer, for example, is input via a SCSI interface. Input data is transmitted in the form of data units each having a prescribed fixed length, and received data is compressed according to a prescribed scheme when necessary and temporarily stored in a buffer memory. The data stored in the buffer memory is supplied to a recording/reproduction system in a prescribed fixed-length unit called a group each time and recorded on the magnetic tape of a tape cassette by a rotary head.

At the time of reproduction, data on a magnetic tape is read out by the rotary head and temporarily stored in the buffer memory. The data that is output from the buffer memory is expanded if it was compressed at the time of recording, and then transmitted to the host computer via the SCSI interface.

The data recording area on a magnetic tape can be divided on a partition-by-partition basis. The tape streamer drive can perform data reproduction and writing on respective partitions independently of each other.

Incidentally, in a data storage system consisting of a tape streamer drive of the above type and a tape cassette, to properly perform a recording or reproducing operation on the magnetic tape of the tape cassette, various kinds of information relating to positions on the magnetic tape and information relating to a use history etc. of the magnetic tape are necessary as, for example, management information that is utilized by the tape streamer drive to manage recording and reproducing operations etc.

In view of the above, for example, it has been conceived to provide an area of such management information at the head of a magnetic tape and the head of each partition.

The tape streamer drive reads out necessary management information by accessing such management information areas before performing a data recording or reproducing operation on the magnetic tape, and performs various processing operations based on the management information so that the ensuing recording or reproducing operation will be performed properly.

When the data recording or reproducing operation is finished, to rewrite the contents of pieces of management information that need to be changed as a result of the recording or reproducing operation, management information areas are accessed again and their information contents are rewritten. A preparation for the next recording or reproducing operation is thus made. Then, the tape streamer drive performs, for example, unloading and ejection of the tape cassette.

However, when either a recording operation or a reproducing operation is performed based on management information in the above manner, at the start of the operation the tape streamer drive needs to access the management information area at the head of the magnetic tape or the head of a partition. Also at the end of the operation, the tape streamer drive needs to access such a management information area to write/read information to/from it. That is, loading or unloading cannot be performed in a state that data recording or reproduction has just been finished, that is, in a state that a halfway position of the magnetic tape is located at the head-acting position.

In the case of the tape streamer drive, since access requires physically feeding a magnetic tape, it takes a considerable time to access a management information area at the head of the magnetic tape or the head of a partition at the end of a recording or reproducing operation. In particular, in a case where data recording or reproduction has finished in a state that a point of the magnetic tape that is physically very distant from the management information area is located at the head-acting position, the necessary tape feed length is long accordingly and hence the feeding needs an extra time.

As described above, in the data storage system using a tape cassette as a medium, the time required until completion of one recording or reproducing operation, that is, the time taken by access operations that are performed between loading and final unloading of a magnetic tape, is relatively long. It is preferable that the time required for such a series of access operations be made as short as possible.

In view of the above, a technique has been developed that a nonvolatile memory, for example, is provided in a tape cassette and management information is stored in the nonvolatile memory.

In a tape streamer drive corresponding to such a tape cassette, an interface for writing and reading on the nonvolatile memory is provided and management information relating to data recording and writing on the magnetic tape is read from and written to the nonvolatile memory. Therefore, it is not necessary to rewind the magnetic tape so that the tape top, for example, is located at the head-acting position, at the time of loading or unloading; that is, loading or unloading can be performed even in a state that a halfway point of the magnetic tape is located at the head-acting position.

Further, this technique facilitates setting of more partitions on a tape and proper management of them.

For a tape cassette having a nonvolatile memory, the tape streamer drive is required to support use of the tape cassette in a mode in which a number of partitions can be set and used (for convenience of description, this mode is called "multi-partition mode").

On the other hand, for a tape cassette not having a nonvolatile memory, only one or two partitions are supported conventionally. The tape streamer drive is also required not to cause any problem in using a tape cassette in such a mode (for convenience of description, this mode is called "normal mode"). Naturally, there is a request for enabling use of a tape cassette having a nonvolatile memory in the normal mode.

SUMMARY OF THE INVENTION

The present invention has been made in view of the above circumstances, and an object of the invention is therefore to provide a tape drive apparatus capable of supporting use of a tape cassette in both of a first mode (normal mode) and a second mode (multi-partition mode), as well as a tape drive apparatus capable of performing tape formatting including mode setting on a tape cassette.

To attain the above object, the invention provides a tape drive apparatus in which when a tape cassette is mounted, whether the tape cassette is of a first mode or a second mode is judged based on one or both of management information that is read out from the magnetic tape by tape driving means and management information that is read out from the memory by memory driving means, and operation setting is performed in accordance with the mode thus judged. That is, both modes can be supported by performing operation setting in accordance with the mode of a tape cassette.

According to a second aspect of the invention, there is provided a tape drive apparatus comprising storing means for storing mode information relating to a tape cassette; receiving means for receiving a command from a host apparatus; and control means for setting the tape cassette to a first mode or a second mode by causing one or both of tape driving means and memory driving means to write management information by using the mode information stored in the storing means when the receiving means receives a formatting command.

That is, according to the second aspect of the invention, the tape cassette itself is set to the first or second mode by tape formatting. The tape formatting including the mode setting is performed in accordance with a command that is supplied from the host apparatus.

When a tape cassette that has already been subjected to tape formatting is mounted, the operation of the tape drive apparatus is set in accordance with the mode of the tape cassette.

BRIEF DESCRIPTION OF THE DRAWINGS

FIG. 10 is a table showing definitions of ID area information;

FIG. 11 is a table showing definitions of an area ID;

FIG. 13 is a table showing data contents of volume information of the MIC;

FIGS. 14(A) and 14(B) are tables showing data contents of a system area on a magnetic tape;

FIGS. 15(A) and 15(B) are tables showing data contents of a mode setting command according to the embodiment;

FIG. 16 is a table showing mode information according to the embodiment;

FIG. 18 is a table showing data contents of a formatting command according to the embodiment;

FIG. 25 is a table showing data contents of an append partition command according to the embodiment;

FIG. 27 is a table showing data contents of a delete partition command according to the embodiment;

FIGS. 29–34 show example delete partition operations according to the embodiment.

DETAILED DESCRIPTION OF THE PREFERRED EMBODIMENT

Figure 1:
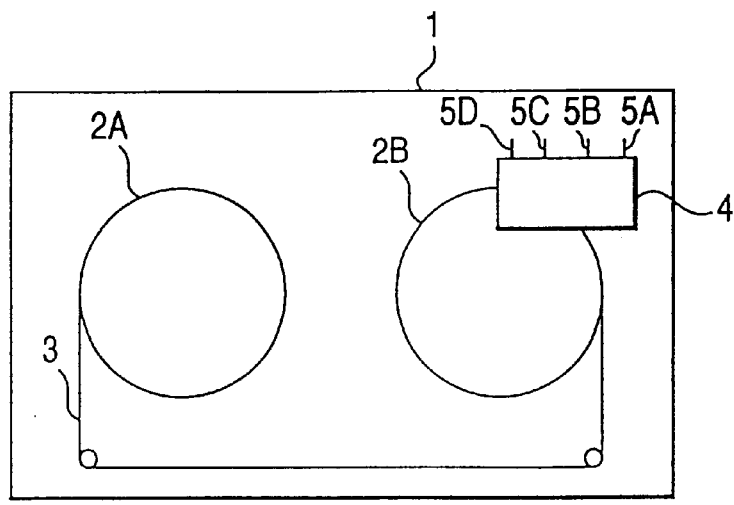
FIG. 1 schematically shows the internal structure of a tape cassette according to an embodiment of the present invention.

An embodiment of the present invention will be hereinafter described with reference to the accompanying drawings.

Various tape cassettes having a nonvolatile memory and various tape drive apparatuses (tape streamer drives) that correspond to those tape cassettes and enable recording and reproduction of digital data have been proposed by the present assignee. The present invention is applied to a data storage system that is a combination of those tape cassettes having a memory and tape streamer drives. In the following description, the nonvolatile memory provided in a tape cassette will be called "MIC" (memory in cassette). Further, the tape streamer drive of this embodiment also handles a tape cassette not having an MIC.

The description will be made in the following order:
1. Configuration of tape cassette
2. Configuration of recording/reproduction apparatus
3. Structure of data to be recorded on magnetic tape
4. ID area
5. Data structure of MIC
6. Tape formatting operation 7. Tape recognition
8. Loading and unloading at partition
9. Append partition
10. Delete partition 1. Configuration of Tape Cassette First, the tape cassette having an MIC that corresponds to the tape streamer drive of the embodiment will be described with reference to FIGS. 1 and 2.

FIG. 1 conceptually shows the internal structure of the tape cassette. Reels 2A and 2B are provided inside the tape cassette 1 shown in FIG. 1 and a magnetic tape 3 having a tape width of 8 mm is wound on the reels 2A and 2B so as to extend in between.

The tape cassette 1 is provided with an MIC 4 that is a nonvolatile memory. A power terminal 5A, a data input terminal 5B, a clock input terminal 5C, a ground terminal 5D, etc. are led out from the module of the MIC 4. As described later, the MIC 4 stores the date and place of manufacture, the thickness, length, and material of the tape, information relating to use history etc. of recorded data of respective partitions, user information, and other information of the tape cassette 1 in which the MIC 4 is incorporated.

In this specification, since various kinds of information stored in the MIC 4, "system area" information etc. (described later) stored in the magnetic tape are mainly used for various kinds of management relating to recording and reproduction on the magnetic tape 3, they are generically called "management information."

Figure 2:
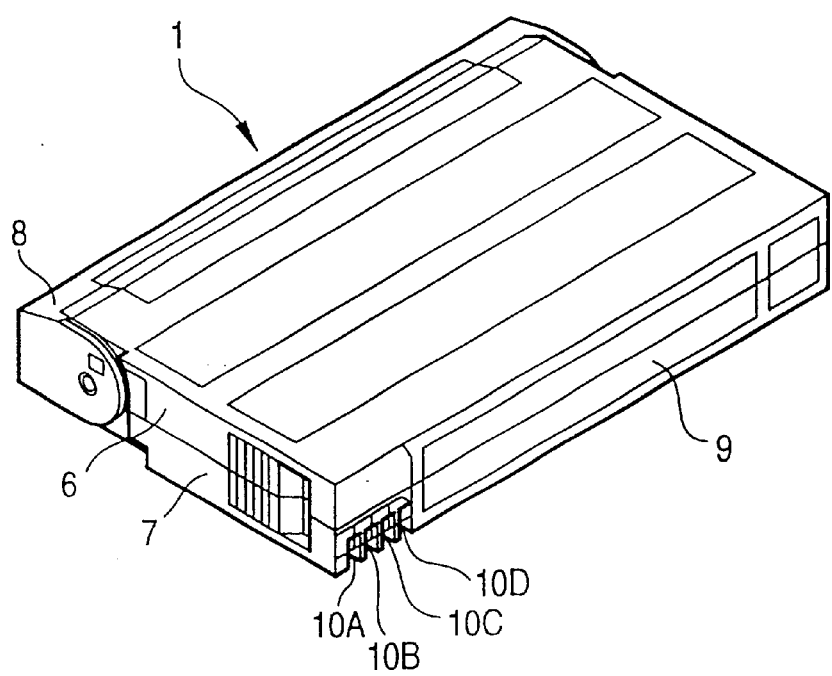
FIG. 2 is a perspective view showing an appearance of the tape cassette of the embodiment.

FIG. 2 shows an example appearance of the tape cassette 1. The overall chassis is composed of an upper case 6, a lower case 7, and a guard panel 8, and is configured basically in the same manner as the tape cassette that is used for ordinary 8 mm VTRs. A side label surface 9 of the tape cassette 1 is provided with terminal pins 10A–10D, which are connected to the power terminal 5A, the data input terminal 5B, the clock input terminal 5C, and the ground terminal 5D shown in FIG. 1, respectively. That is, in this embodiment, the tape cassette 1 is in physical contact with the tape streamer drive via the terminal pins 10A–10D, whereby a data signal etc. are mutually transmitted between the tape cassette 1 and the tape streamer drive (described next).

2. Configuration of Recording/Reproduction Apparatus

Next, the configuration of the tape streamer drive according to the embodiment will be described with reference to FIG. 3. The tape streamer drive uses a tape cassette having a tape width of 8 mm and performs recording and reproduction on the magnetic tape by helical scanning.

Figure 3:
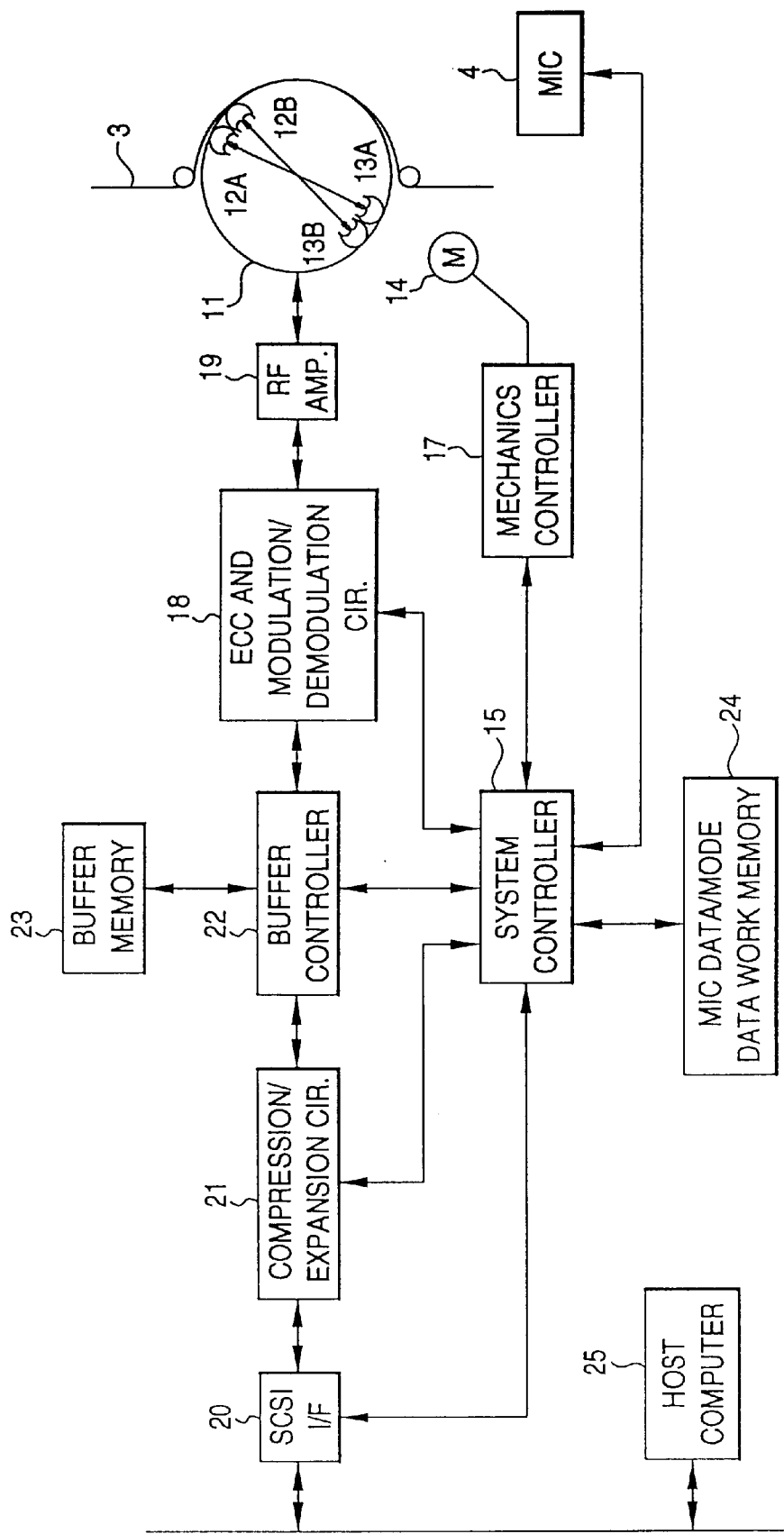
FIG. 3 is a block diagram of a tape streamer drive according to the embodiment.

As shown in FIG. 3, for example, a rotary drum 11 is provided with two recording heads 12A and 12B and two reproduction heads 13A and 13B. The recording heads 12A and 12B are configured in such a manner that two gaps having different azimuth angles are arranged very close to each other. Similarly, the reproduction heads 13A and 13B are configured in such a manner that two gaps having different azimuth angles are arranged very close to each other.

The rotary drum 11 is rotated by a drum motor 14, and part of the magnetic tape 3 that is drawn out of the tape cassette 1 is wound on the rotary drum 11. The magnetic tape 3 is fed by a capstan motor and a pinch roller (both not shown). The drum motor 14 is driven under the control of a mechanics controller 17. The mechanics controller 17 performs a servo control and a tracking control on the drum motor 14, and is bidirectionally connected to a system controller 15 which controls the entire system.

The tape streamer drive employs a SCSI interface 20 for data input/output. For example, at the time of data recording, data is input one after another from a host computer 25 via the SCSI interface 20 in the form of fixed-length records (transmission data units) and supplied to a compression/expansion circuit 21. This type of tape streamer drive system also has a mode in which data is transmitted from the host computer 25 in the form of collections of variable-length data. This mode is not described here.

If necessary, the compression/expansion circuit 21 compresses input data according to a prescribed scheme. For example, where a compression scheme of the LZ coding is employed, dedicated codes are assigned to character strings that were processed in the past and stored in the form of a dictionary. A character string that is input later is compared with the contents of the dictionary. If an input data character string coincides with a code in the dictionary, the data of the input character string is replaced by the code in the dictionary. Data of input character strings that do not coincide with any code in the dictionary are given new codes one by one and registered in the dictionary. Data compression is effected by registering data of input character strings in a dictionary and replacing character string data with codes in the dictionary in the above-described manner.

An output of the compression/expansion circuit 21 is supplied to a buffer controller 22, which temporarily stores the output of the compression/expansion circuit 21 in a buffer memory 23 by its control operation. Controlled by the buffer controller 22, data accumulated in the buffer memory 23 are finally handled as data of fixed-length units (called "groups") each corresponding to 40 tracks of the magnetic tape 3. Those data are supplied to an ECC and modulation/demodulation circuit 18.

In the ECC and modulation/demodulation circuit 18, input data are given error correction codes and subjected to modulation so as to become suitable for magnetic recording. Resulting data are supplied to an RF amplifier 19. A recording signal as amplified by the RF amplifier 19 is supplied to the recording heads 12A and 12B, whereby the data are recorded on the magnetic tape 3.

To briefly describe a data reproducing operation, recorded data of the magnetic tape 3 are read out by the reproduction heads 13A and 13B to produce an RF reproduction signal and the reproduction output is supplied via the RF amplifier 19 to the ECC and modulation/demodulation circuit 18, where it is subjected to demodulation and error correction. A demodulation output of the ECC and modulation/demodulation circuit 18 is temporarily stored in the buffer memory 23 under the control of the buffer controller 22, and then supplied to the compression/expansion circuit 21.

Based on a judgment by the system controller 15, the compression/expansion circuit 21 expands the data if they were subjected to compression in the compression/expansion circuit 21 at the time of recording. If the data were not subjected to compression in the compression/expansion circuit 21, the compression/expansion circuit 21 passes and outputs the data as they are without expanding them.

Output data of the compression/expansion circuit 21 are output, as reproduction data, to the host computer 25 via the SCSI interface 20.

FIG. 3 shows not only the magnetic tape 3 but also the MIC 4 in the tape cassette 1. When the tape cassette main body is mounted in the tape streamer drive, a connection is made so as to establish a state that the system controller 15 can perform data input or output on the MIC 4 via the terminal pins shown in FIG. 1.

A work memory 24 is a memory that is used for, for example, calculations and storage of data read out from the MIC 4, data to be written to the MIC 4, mode data that is set on a tape cassette basis, various flag data, and other data. The work memory 24 may an internal memory of a microcomputer serving as the system controller 15. Alternatively, a certain region of the buffer memory 23 may be used as the work memory 24.

The above-mentioned mode that is set on a tape cassette basis is a mode that is set in each tape cassette 1 itself; it is a normal mode or a multi-partition mode.

The normal mode means a mode in which the tape cassette 1 is used with one or two partitions. The multi-partition mode is a mode in which three or more partitions can be formed. In the multi-partition mode, loading and unloading can be performed in a state that each partition (i.e., a halfway point of the magnetic tape 3) is located at the head-acting position.

One of the above two modes is set by the tape streamer drive for a tape cassette 1 for which no mode has been set (or for which the user wants to set a mode after performing initialization). When a tape cassette 1 for which a mode has already been set is mounted, the system controller 15 sets its operation mode so that it will be suitable for the mode of the tape cassette 1.

The above-described tape cassette 1 having the MIC 4 allows arbitrary selection of a multi-partition mode or a normal mode. However, a tape cassette not having an MIC allows selection of only a normal mode.

Mutual information transmission between the MIC 4 and the external host computer 25 is performed by using SCSI commands. Therefore, it is not necessary to provide a dedicated line between the MIC 4 and the host computer 25. As a result, data exchange between the tape cassette 1 and the host computer 25 can be performed through only the SCSI interface 20.

The system controller 15 performs various communications with the host computer 25 by using SCSI commands. In particular, in this embodiment, such operations as mode setting for the tape cassette 1 and various partition editing operations (described later) are performed by the system controller 15 in accordance with SCSI commands that are supplied from the host computer 25.

One feature of the embodiment is that the tape cassette 1 itself has a mode (a normal mode or a multi-partition mode). Setting of such a mode for the tape cassette 1, partition appending, partition deletion, etc. are performed in accordance with SCSI commands that are supplied from the host computer 25. Data formats of SCSI commands used for such operations and processes that are executed in accordance with those commands will be described later individually.

3. Structure of Data to be Recorded on Magnetic Tape

Next, a data format that is applied to the above-described data storage system consisting of the tape streamer drive and the tape cassette 1 will be outlined.

Figure 4:
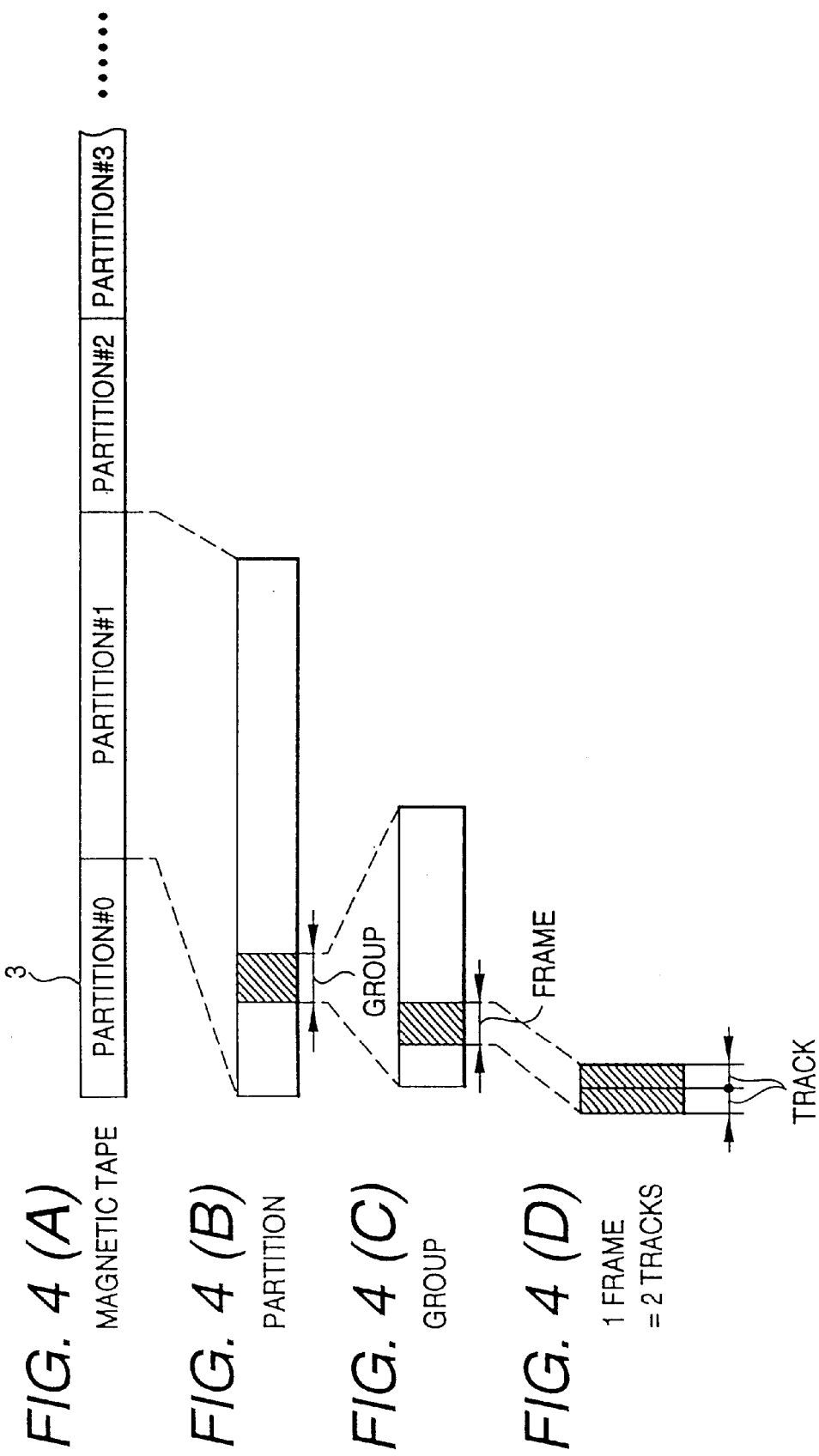
FIGS. 4(A)–4(D) show a structure of data to be recorded on a magnetic tape.

FIGS. 4(A)–4(D) show a structure of data to be recorded on the magnetic tape 3. FIG. 4(A) schematically shows one magnetic tape 3. In this embodiment, in the case of the multi-partition mode, one magnetic tape 3 can be used in such a manner that it is divided into partitions as shown in FIG. 4(B). In the system of this embodiment, a maximum of 256 partitions can be set and managed. As shown in FIG. 4(A), partitions are managed by giving them respective partition numbers such as partition #0, #1, #2, #3, etc.

Therefore, in this embodiment, recording, reproduction, or the like of data can be performed independently for each partition. For example, in one partition shown in FIG. 4(B), the unit of data recording can be a fixed-length unit called "group" shown in FIG. 4(C); data are recorded on the magnetic tape 3 with groups as units of recording.

In this case, one group corresponds to a data amount of 20 frames. As shown in FIG. 4(D), one frame consists of two tracks. The two tracks constituting one frame are plus-azimuth and minus-azimuth tracks that are adjacent to each other. Therefore, one group consists of 40 tracks.

Figure 5:
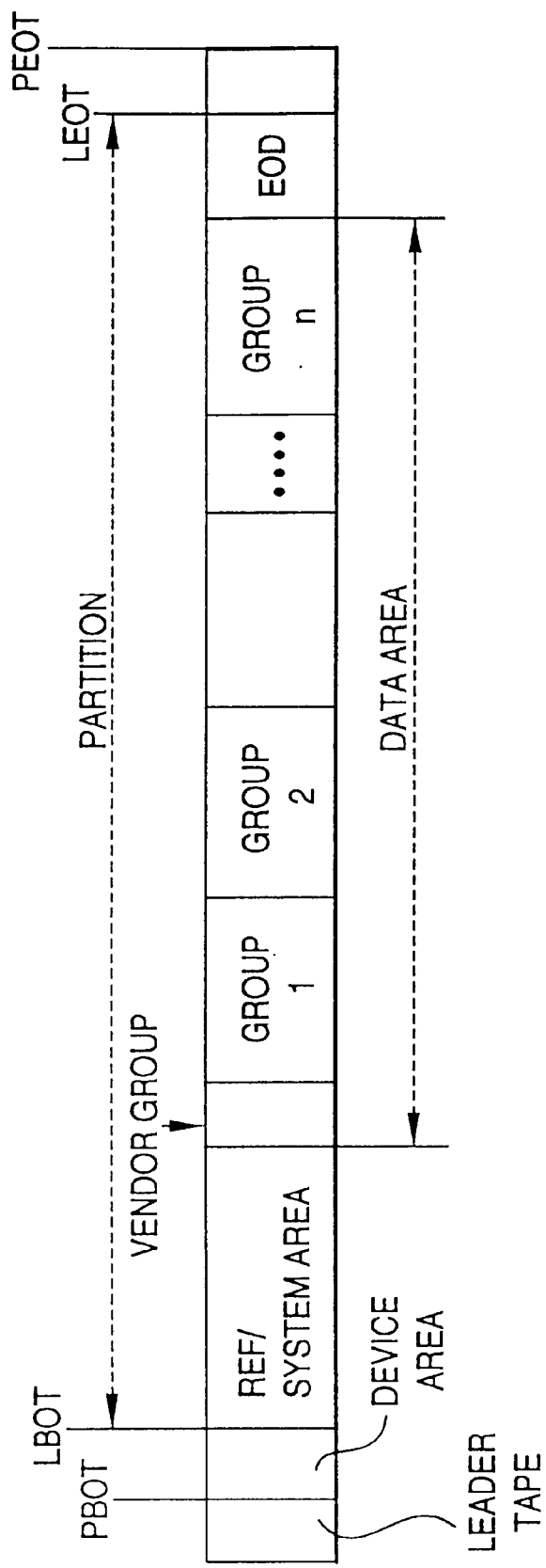
FIG. 5 schematically shows a data structure of one partition.

Each partition shown in FIGS. 4(A) and 4(B) has a data structure shown in FIG. 5. FIG. 5 is directed to a case where one partition covers the entire tape length. Although this embodiment enables loading and unloading in a state that a halfway point of the tape is located at the head-acting position by providing the MIC 4 in the tape cassette 1 and employing a later-described data structure of the magnetic tape 3 (in the case of the multi-partition mode), FIG. 5 shows a general purpose format that is applicable to also a tape cassette not having an MIC.

In the case of FIG. 5, a leader tape is located at the physical head position of the magnetic tape 3, i.e., at its beginning portion, followed by a device area for loading and unloading of the tape cassette 1. The head of the device area is a PBOT (physical beginning of tape).

The device area is followed by a reference area and a system area where to store tape use history etc. (in the following, the reference area and the system area are together called a system area). The system area is followed by a data area. The head of the system area is an LBOT (logical beginning of tape).

In the data area, a vendor group where to store information relating to a vendor who generates and supplies data is provided at the first portion, and thereafter a plurality of groups (see FIG. 4(C)) are arranged in succession as group 1 to group n. The last group n is followed by an EOD (end of data) area that indicates the end of the data area of the partition. The tail of the EOD is an LEOT (logical end of tape). A PEOT (physical end of tape) indicates the physical end of the tape or the partition.

Figure 6:
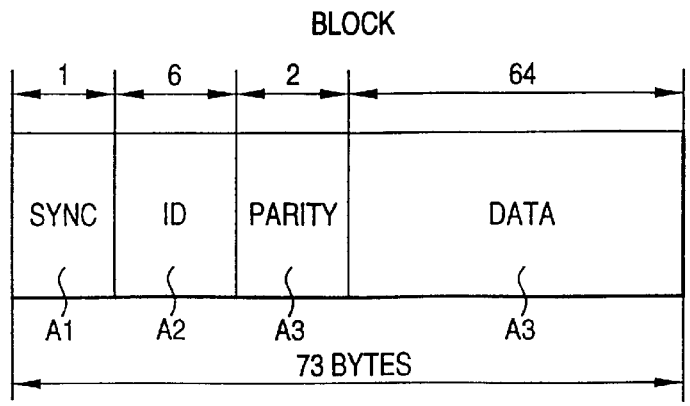
FIGS. 6(A)–6(C) schematically show a data structure of one track.
Figure 6:
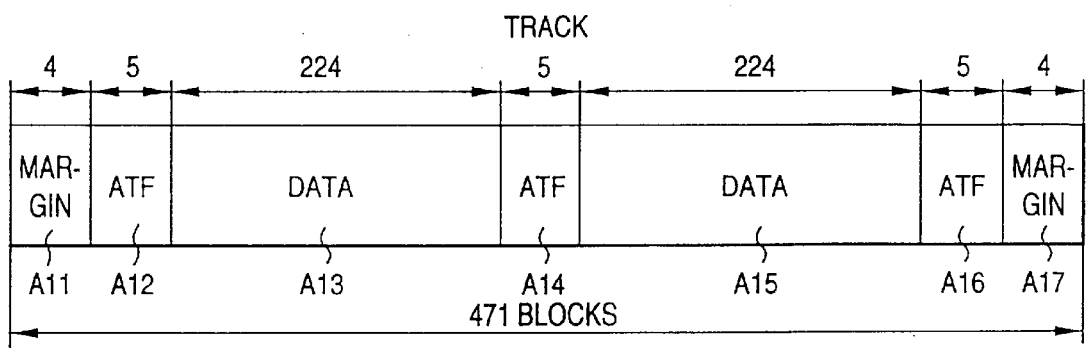
Figure 6:
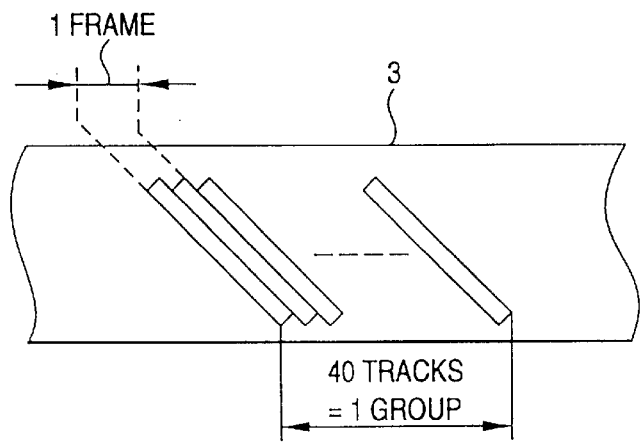

FIGS. 6(A)–6(C) show a data structure of one track shown in FIG. 4(D). FIG. 6(A) shows a data structure of one block, which consists of a 1-byte SYNC data area A1, a 6-byte ID area A2 to be used for a search etc., a 2-byte parity area A3 for error correction of ID data, and a 64-byte data area A4.

FIG. 6(B) shows a data structure of one track which consists of 471 blocks in total. Four-block margin areas A11 and A17 are located at both ends, and ATF areas A12 and A16 for tracking control are provided after the margin area A11 and before the margin area A17, respectively. An ATF area A14 is provided at the middle of one track. Each of the ATF areas A12, A14, and A16 consists of five blocks. And 224-block data areas A13 and A15 are provided between the ATF areas A12 and A14 and between the ATF areas A14 and A16, respectively. Therefore, in total, the data areas A13 and A15 occupy 224×2=488 blocks among all of the 471 tracks of one track.

Tracks are recorded on the magnetic tape 3 in a physical pattern as shown in FIG. 6(C), and 40 tracks (=20 frames) constitute one group.

FIGS. 7(A)–7(C) show example tape layouts of normal modes and a multi-partition mode.

FIG. 7(A) shows an example of a normal mode/one-partition case. This layout is approximately the same as described above in connection with FIG. 5. FIG. 7(B) shows an example of a normal mode/two-partition case. Partition #0 and partition #1 are formed in a manner as shown. The normal modes shown in FIGS. 7(A) and 7(B) are applicable to both of the tape cassette 1 having the MIC 4 and a tape cassette not having an MIC 4.

FIG. 7(C) shows an example of a multi-partition mode case. Partition #0 to partition #N−1 are formed. In the case of the multi-partition mode, each partition is provided with an optional device area as the last area in addition to the areas shown in FIG. 5.

As described above, the device area in the vicinity of the tape top is an area for loading and unloading. The optional device area is prepared to enable partition-by-partition loading and unloading (i.e., loading and unloading in a state that a halfway point of the tape is located at the head-acting position).

Figure 7:
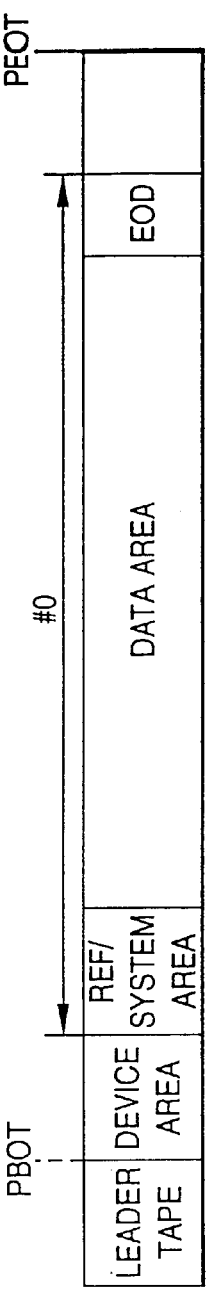
FIGS. 7(A)–7(C) show tape layouts of respective modes according to the embodiment.
Figure 7:
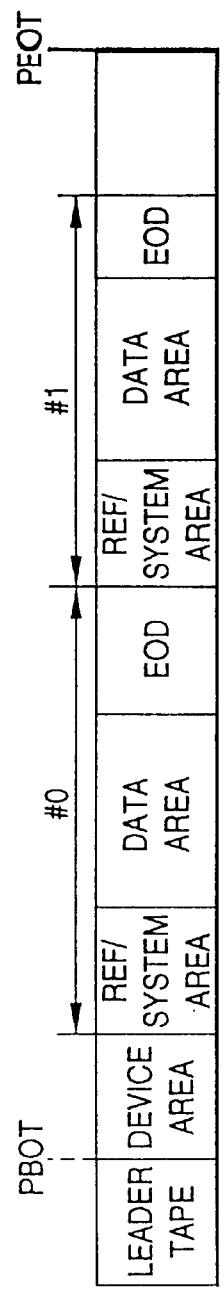
Figure 7:
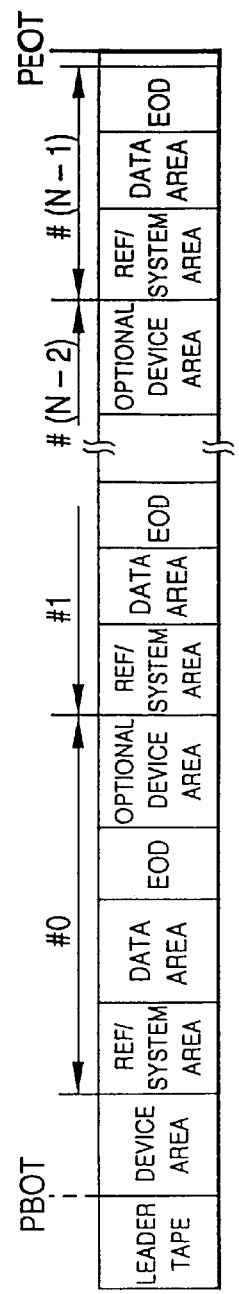

The tape layout of the multi-partition mode shown in FIG. 7 (C) is applicable to only the tape cassette 1 having the MIC 4.

4. ID Area

Next, the ID area A2 shown in FIG. 6(A) will be described with reference to FIGS. 8–11.

Figure 8:
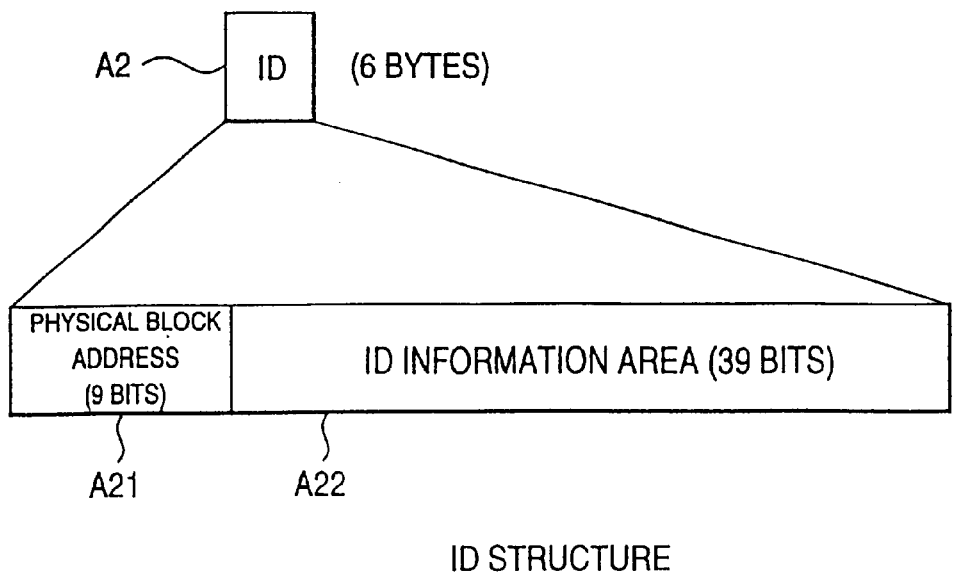
FIG. 8 schematically shows a data structure of an ID area.

FIG. 8 shows a data structure of the ID area A2. As shown in FIG. 8, the ID area A2 consists of a 9-bit physical block address A21 and a 39-bit ID information area A22 following it.

Figure 9:
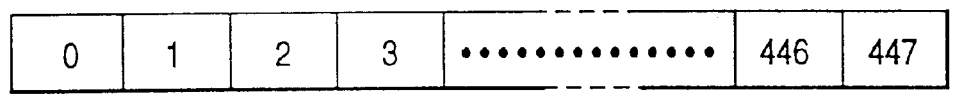
FIG. 9 schematically shows physical block address numbers on one track.

Since as described above all the data areas A13 and A15 of one track consist of 448 blocks, the number of physical block addresses A21 included in all the data areas A13 and A15 is also equal to 448. For example, as schematically shown in FIG. 9, the 448 physical block addresses A21 starting from the one located at the head of one track are given address values 0 to 447 (decimal representation) in the increasing order.

This makes it possible for the recording/reproduction apparatus side, for example, to properly deal with information of the ID information areas A22 that are included in the data areas A13 and A15 in each track. The data size of the ID information areas A22 included in the data areas A13 and A15 in one track is calculated as 2,184 bytes:

39 bits×448 blocks=17,472 bits=2,184 bytes

FIG. 10 shows the kinds of ID area information that is stored in the ID information area A22 shown in FIG. 8. The pieces of ID area information shown in FIG. 10 is assigned to and stored in the ID information areas A22 of 2,184 bytes according to a prescribed rule. To enable reliable reading of ID area information by the tape streamer drive, ID area information of the same kind is recorded plural times in one track according to a prescribed rule.

In FIG. 10, a raw format ID (16 bits) indicates the type of a basic format relating to the magnetic tape 3. In this embodiment, for example, the raw format ID indicates such information as a track pitch, a 1-frame data size, the number of blocks included in one track, a 1-block data size, a tape length, a tape thickness, and a tape material. A logical format ID (8 bits) indicates the type of a recording format actually used.

As shown in FIG. 10, a logical frame ID (8 bits) consists of a last frame ID (1 bit), an ECC frame ID (1 bit), and a logical frame number (6 bits). The last frame ID indicates whether the frame including the ID area concerned is the last frame in the group. The ECC frame ID indicates whether recorded data of the data areas A13 and A15 of the frame concerned are ECCs (error correcting codes).

As described above, one group consists of 20 frames. The logical frame number indicates where the frame concerned stands in the succession of frames in the group.

A partition ID (16 bits) indicates the partition number of the partition including the frame concerned.

An area ID (4 bits) indicates to which area the frame concerned belongs. A data ID (4 bits) indicates the type of data processing form that is based on a recording format. An N-position (4 bits) and an N-repeats (4 bits) define information relating to data that corresponds to a multiplex recording mode.

A group count (24 bits) indicates the total number of groups included in the partition to the group including the frame concerned. A file-mark count (32 bits) indicates the total number of file marks included in the partition from its start position to the group concerned. The file mark is information indicating a boundary of data files in each partition.

A save-set mark count (32 bits) indicates the total number of file marks included in the partition from its start position to the group concerned. The save-set mark is information indicating a boundary of data save positions in each partition.

A record count (32 bits) indicates the total number of records included in the partition from its start position to the group concerned. An absolute frame count (24 bits) indicates the total number of frames included in the partition from its start position to the group concerned. Reserved areas are provided for, for example, future addition of ID area information.

The definitions of the ID area information and the numbers of bits given to the respective kinds of ID area information shown in FIG. 10 are just examples and nay be altered in accordance with actual use conditions.

The area ID among various kinds of ID area information show n in FIG. 10 will be described below.

FIG. 11 shows definitions of the area ID. In FIG. 11, bit numbers (3-2-1-0) are given to the four respective bits constituting the area ID. As shown in FIG. 11, if the values of the respective bit numbers (3-2-1-0) are [0000], the area ID is a device area. If the values of the bit numbers are [0001], the area ID is a reference area. If they are [0010], the area ID is a system log area. A set of bit number values [0011] is reserved.

If the bit number values are [0100], the area ID is a data area. IF they are [0101], the area ID is an EOD area. A set of bit number values [0110] is reserved. If they are [0111], the area ID is an option device area (see FIG. 7 (C)) that enables loading and unloading of the magnetic tape 3 in a state that an area other than the indispensable device area shown in FIG. 5 is located at the head-acting position.

In FIG. 11, the number shown in parentheses in each space where values of bit numbers (3-2-1-0) are shown is a decimal number obtained by converting a binary number.

5. Data Structure of MIC

Next, the data structure of the MIC 4 that is provided in the tape cassette 1 will be described.

Figure 12:
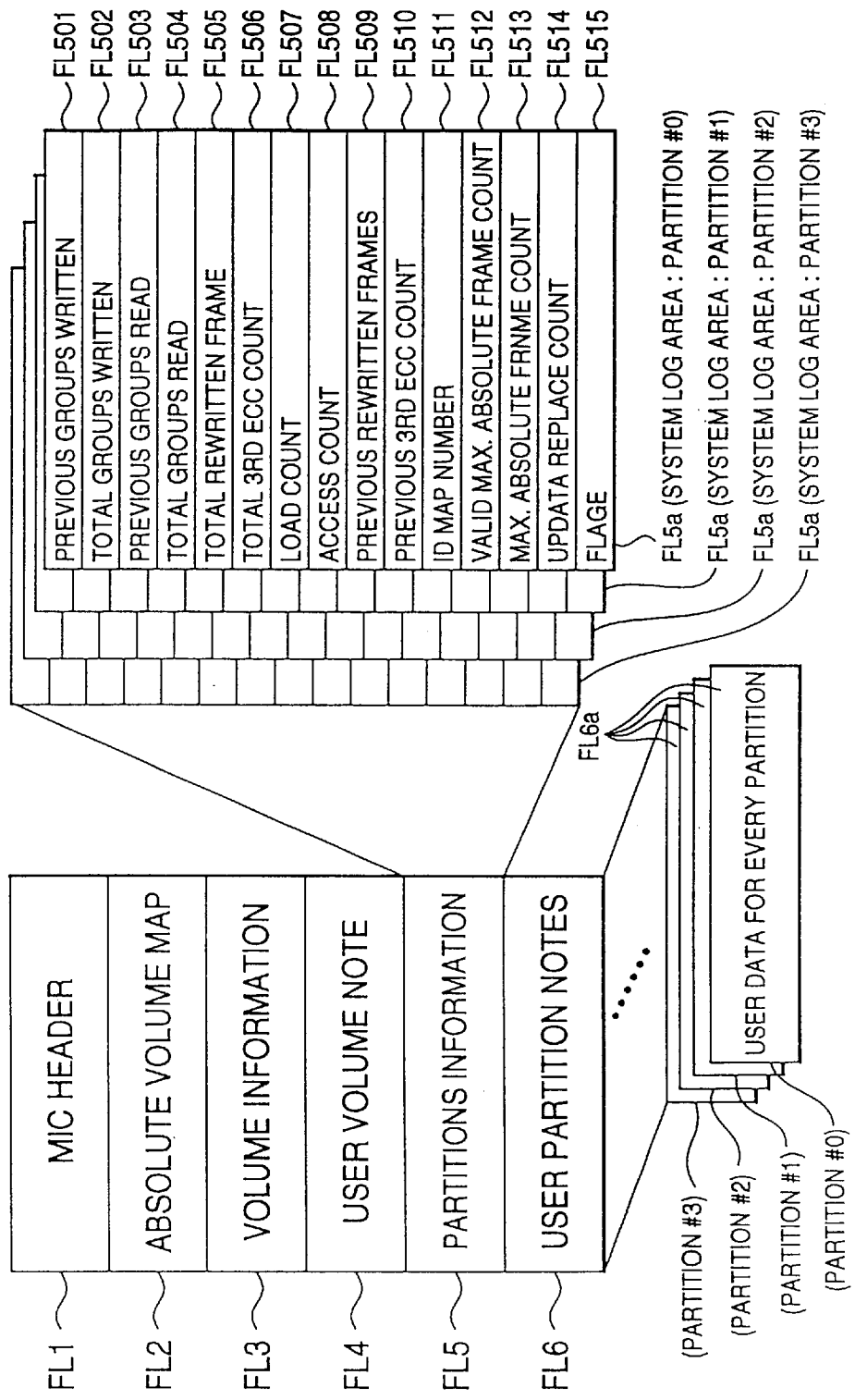
FIG. 12 schematically shows a data structure of an MIC.

FIG. 12 shows a structure of data to be stored in the MIC 4. The capacity of the MIC 4 is 2 megabytes, for example.

As shown in FIG. 12, fields FL1–FL6 are set in this area.

Among fields FL1–FL6, field FL1 is an MIC header field, where various kinds of information relating to manufacture of the tape cassette 1, tape information and partition-based information occurring at the time of initialization, and other information are written.

Field FL2 is an absolute volume map field, where absolute position information relating to data that are recorded on a one-volume magnetic tape, for example, is stored.

Field FL3 is a volume information field, where various kinds of use history information relating to one-volume magnetic tape are stored. The information stored in these fields is used for recording and reproduction controls etc. in the tape streamer drive.

FIG. 13 shows an example of data contents to be described as the volume information. As shown in FIG. 13, 20-byte "eject status," 4-byte "reel diameter," 3-byte "initialize count," 2-byte "raw format ID," 1-bit "DDS mode," 1-bit "ULPBOT," 2-bit "sys log alive," 1-byte "last partition number," and "device area map" are described as the volume information.

Among the above pieces of information, "eject status" and "reel diameter" describe information of a tape cassette unloading position (i.e., radial positional information).

"DDS mode" is a bit indicating a normal mode or a multi-partition mode. "DDS mode" indicates a normal mode if it has a value "0," and indicates a multi-partition mode if it has a value "1."

"ULPBOT" indicates a load/unload permission status. If "ULPBOT" has a value "1," it indicates that loading and unloading at a device area or an optional device area, that is, loading and unloading on a partition basis, are permitted. If "ULPBOT" has a value "1," it indicates that loading and unloading should be performed only at the device area at the tape top.

"Sys log alive" indicates on which of the tape 3 and the MIC 4 system log information is recorded. That is, if "sys log alive" is "00," it indicates that system log information exists on the magnetic tape 3. If "sys log alive" is "11," it indicates that system log information exists on the magnetic tape 3 and in the MIC 4.

"Last partition number" indicates the number of the last partition formed.

"Device area map" indicates position s of device area s (and optional device areas) on the magnetic tape 3.

Field FL4, which follows field FL3 where to describe the above-described volume information, is a user volume note field, which stores information provided by a user (a vendor or the like) for the tape cassette 1 itself. When necessary, this information is supplied to the external host computer 25 and used for a necessary operation control.

Field FL5 is a partition information field, which stores various kinds information relating to partition-based use histories of the magnetic tape 3 that are written to the magnetic tape 3. These pieces of information are used for the tape streamer drive to manage its recording and reproducing operations. As shown in FIG. 12, the partition information field consists of system log areas FL5a.

Since the system log areas FL5a are formed so as to correspond to respective partitions on the magnetic tape 3 where data are actually recorded, the number of tables of the system log areas FL5a corresponds to the number of partitions actually formed on the magnetic tape 3.

Since the system log areas FL5a are formed so as to correspond to respective partitions on the magnetic tape 3 where data are actually recorded, if a plurality of partitions are formed on the magnetic tape 3, the system log areas FL5a store information relating to the partitions. On the other hand, if only one partition exists, the information of the system log areas FL5a should relate to the entire magnetic tape 3. The following description assumes the former case in which the system log areas FL5a store information relating to partitions.

For example, as shown in FIG. 12, each system log area FL5a has a data structure in which fields FL501–FL515 are provided.

Among fields FL501–FL515, field FL501 is a previous group written field, which stores the number of groups in the partition concerned on the magnetic tape 3 in which data are actually recorded, as counted from a time point when the system log area FL5a concerned was updated last.

Field FL502 is a total group written field, which stores the total number of so far recorded groups in the partition concerned. This value is accumulated until the tape cassette 1 is rendered unusable at the end of its life or disposed of.

As for "previous group written" and "total group written," when, for example, the tape streamer drive is recording data on the magnetic tape 3, the system controller 15 of the tape streamer drive increments their values in accordance with the number of groups on which data are newly recorded by the current recording operation.

Field FL503 is a previous group read field, which stores the number of groups on which reading was actually performed, as counted from a time point when the system log area FL5a concerned was updated last.

Field FL504 is a total group read field, which stores the accumulated number of so far read-out groups in the partition concerned.

Field FL505 is a total rewritten frames field.

Incidentally, in the tape streamer drive of this embodiment, the reproduction heads 13A and 13B are provided on the rotary head 11 with a positional relationship that the reproduction heads 13A and 13B are located before the recording heads 12A and 12B by a prescribed number of tracks. At the time of recording, the two recording heads 12A and 12B record data on the magnetic tape 3 on a frame-by-frame basis (frame: two tracks). The reproduction heads 13A and 13B perform reading on the frame on the magnetic tape 3 on which the data has just been written by the recording heads 12A and 12B. This type of operation is called "read-after-write" (hereinafter abbreviated as RAW). Frame data that is read out by RAW is subjected to error rate detection by the system controller 15. If an error is detected, the recording system is so controlled as to again write the data of the frame where the error occurred.

Field FL505 is a total rewritten frame field, which stores the accumulated number of frames in the partition concerned for which a data rewrite request was made according to the RAW.

Field FL506 is a total 3rd ECC count field. In the tape streamer drive system of this embodiment, data that is read out from the magnetic tape 3 is error-corrected by using C1, C2, and C3 parity and the C3 parity is used when the data is not restored by only the C1 and C2 parity. "Total 3rd ECC count" indicates the accumulated number of groups in the partition concerned that were error-corrected by using the C3 parity.

Field FL507 is a load count field, which stores the accumulated number of times of tape loading.

Field FL508 is an access count field, which stores the number of times of access made by the tape streamer drive to the partition concerned.

Field FL509 is a previous rewritten frames field, which stores the number of frames in the partition concerned for which a data rewrite request was made according to the RAW (described above), as counted from a time point when the system log area FL5a concerned was updated last.

Field FL510 is a previous 3rd ECC count field, which stores the number of groups that were subjected to error correction using the C3 parity, as counted from a time point when the system log area FL5a concerned was updated last.

Field FL511 is an ID map number field, which stores a search index definition number.

Field FL512 is a valid max. absolute frame count field, which stores a last frame count that is valid in the partition concerned. Field FL513 is a max. absolute frame count field, which stores a last frame count of the partition concerned.

Field FL514 is an update replace count field, which stores the accumulated number of times of data rewriting performed by updating on the magnetic tape 3 in the partition concerned.

The last field FL515 is a flags field, which stores, for example, data of flags indicating permission/inhibition of writing and permission/inhibition of reading on the partition concerned, a flag indicating permission/inhibition of data rewriting on the partition concerned according to the RAW at the time of recording, and a flag indicating that a certain operation is currently performed on the partition concerned by the tape streamer drive.

Field FL6, which follows field FL5 having the above-described contents, is a user partition notes field, which stores, on a partition-by-partition basis, various kinds of information such as comments that can be written by the user. The user partition notes field FL6 consists of "user data for every partition" fields FL6a that are formed corresponding to respective data-recorded partitions on the magnetic tape 3.

Incidentally, as described above in connection with FIGS. 5 and 7(C), a system area is provided at the head of each partition on the magnetic tape 3. Part of the system areas provided on the magnetic tape 3 store information whose contents are the same as the contents of data stored in the MIC 4 that are shown in FIGS. 12 and 13. For example, pieces of information that are stored in the above-described volume information field FL3 and system log areas FL5a are stored in system areas. In the data storage system of this embodiment, areas capable of storing system information are provided in both of the MIC 4 and the magnetic tape 3.

FIGS. 14(A) and 14(B) show volume information and partition-based logs (contents of the system log areas FL5a) that are recorded on the magnetic tape 3.

As shown in FIG. 14(A), the volume information that is recorded on the magnetic tape 3 is 2-byte "raw format ID," 1-bit "DDS mode," 1-bit "ULPBOT," 2-bit "sys log alive," 1-byte "last partition number," and "device area map."

As shown in FIG. 14(B), various kinds of information whose contents are the same as the contents of the above-described system log areas FL5a are stored on the magnetic tape 6. Tape Formatting Operation As described above, in the system of this embodiment, the tape cassette 1 itself has a mode which is a normal mode or a multi-partition mode. The tape streamer drive sets an operation mode in accordance with the mode of the tape cassette 1 mounted therein.

Further, the tape streamer drive can perform mode setting as an initializing operation on the tape cassette 1 so as to give it a mode.

A tape formatting operation for setting a mode in the tape cassette 1 will be described below.

To perform tape formatting on the tape cassette 1 that is mounted in the tape streamer drive, the system controller 15 performs operation controls in accordance with a formatting command that is supplied from the host computer 25. At this time, a mode to be set in the tape cassette 1 is determined based on mode information that is held by the work memory 24.

The work memory 24 stores an initial value as the mode information, which can be updated based on the user's intention etc. That is, the mode information in the work memory 24 is rewritten in accordance with a mode setting command that is one of the SCSI commands to be sent from the host computer 25. Alternatively, a mode change over switch or the like may be provided in the tape streamer drive and the mode information stored in the work memory 24 may be updated in accordance with a switching manipulation on the mode change over switch.

The following description is directed to the case where a mode setting command is issued from the host computer 25.

FIG. 15(A) shows data contents of the mode setting command (10 bytes) that is issued from the host computer 25.

"Page code" indicates that the command is a mode setting command. "Page length" indicates the length (the number of bytes) of data contents that follow.

The substantial data contents of the command are AIT, device, ABS, ULPBOT, sys log alive, SPAN, and MIC.

FIG. 15(B) shows details of the respective data contents. The AIT bit is information indicating a mode (a normal mode or a multi-partition mode).

The device bit is information indicating whether to form an optional device area.

The ABS bit is information indicating whether to generate an absolute volume map.

The ULPBOT bit is information indicating whether to permit loading and unloading at an optional device area.

The sys log alive bits are information indicating system area forming locations (MIC 4 and magnetic tape 3).

Mode information to be set in the tape cassette 1 by the mode setting command is specified by a combination of the above data contents.

In this embodiment, four kinds of mode information shown in FIG. 16 are used. Data contents ① and ② correspond to a normal mode. Usually, data contents ① are applied to a tape cassette not having an MIC and data contents ② are applied to the tape cassette 1 having the MIC 4.

Data contents ③ and ④ correspond to a multi-partition mode as for the tape cassette having an MIC and they are different from each other in whether to permit loading and unloading at an optional device area.

Figure 17:
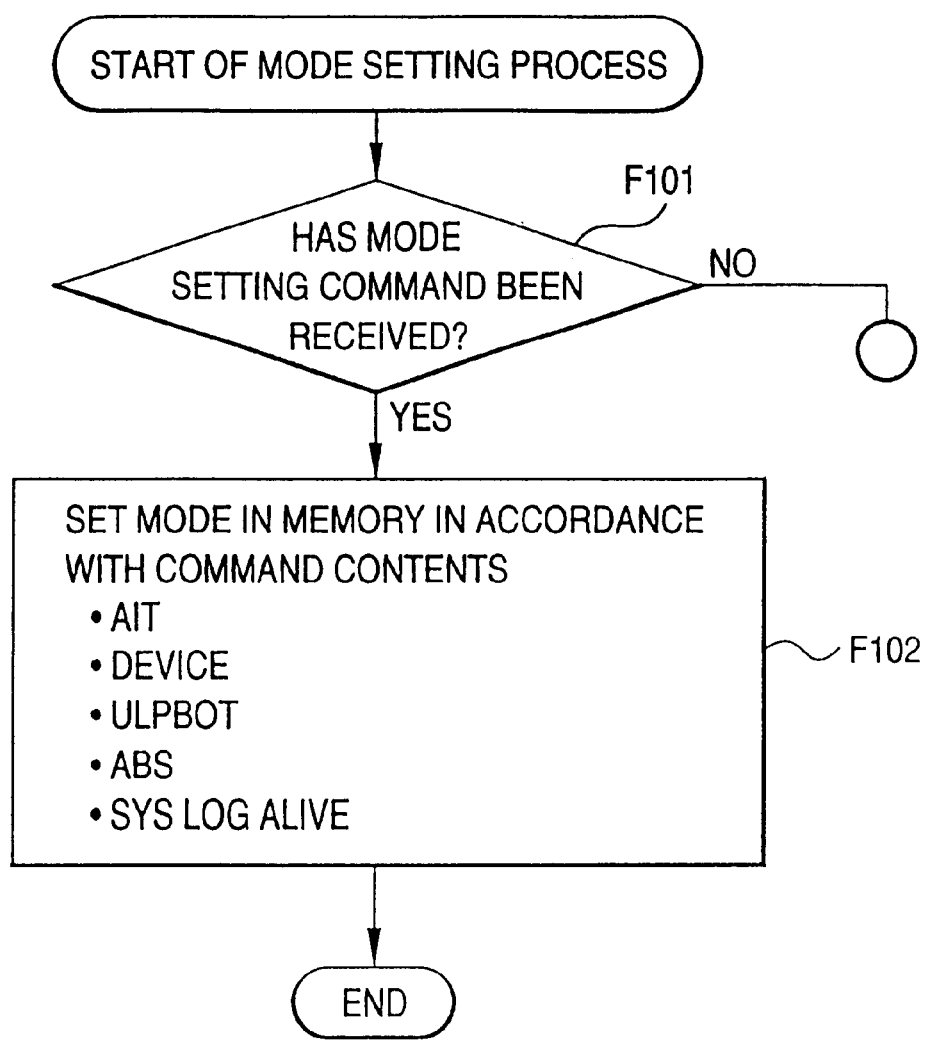
FIG. 17 is a flowchart showing a mode setting process according to the embodiment.

When a mode setting command as described above is issued from the host computer 25, the system controller 15 executes a process shown in FIG. 17.

When a mode setting command is received via the SCSI interface 20, the process of the system controller 15 goes from step F101 to F102. At step F102, the system controller 15 updates the mode information in the work memory 24 in accordance with the contents of the mode setting command. Specifically, mode information of one of items ①–④ shown in FIG. 16 is stored in the work memory 24 based on the data of AIT, device, ABS, ULPBOT, and sys log alive.

In this manner, the mode information held by the work memory 24 can be updated arbitrarily by a mode setting command that is sent from the host computer 25.

When tape formatting including mode setting is actually performed on the tape cassette 1, the system controller 15 performs a formatting operation control by using the mode information that is held by the work memory 24 at that time point.

The tape formatting operation starts when the host computer 25 issues a formatting command. The formatting command includes such information as the number of partitions to be set.

FIG. 18 shows the contents of the formatting command that is issued from the host computer 25 as a SCSI command.

"Page code" indicates that the command is a formatting command. "Page length" indicates the length (the number of bytes) of data contents that follow.

Various kinds of information are described as substantial data contents of the command. In particular, size information for each partition to be set is described as "partition size."

Figure 19:
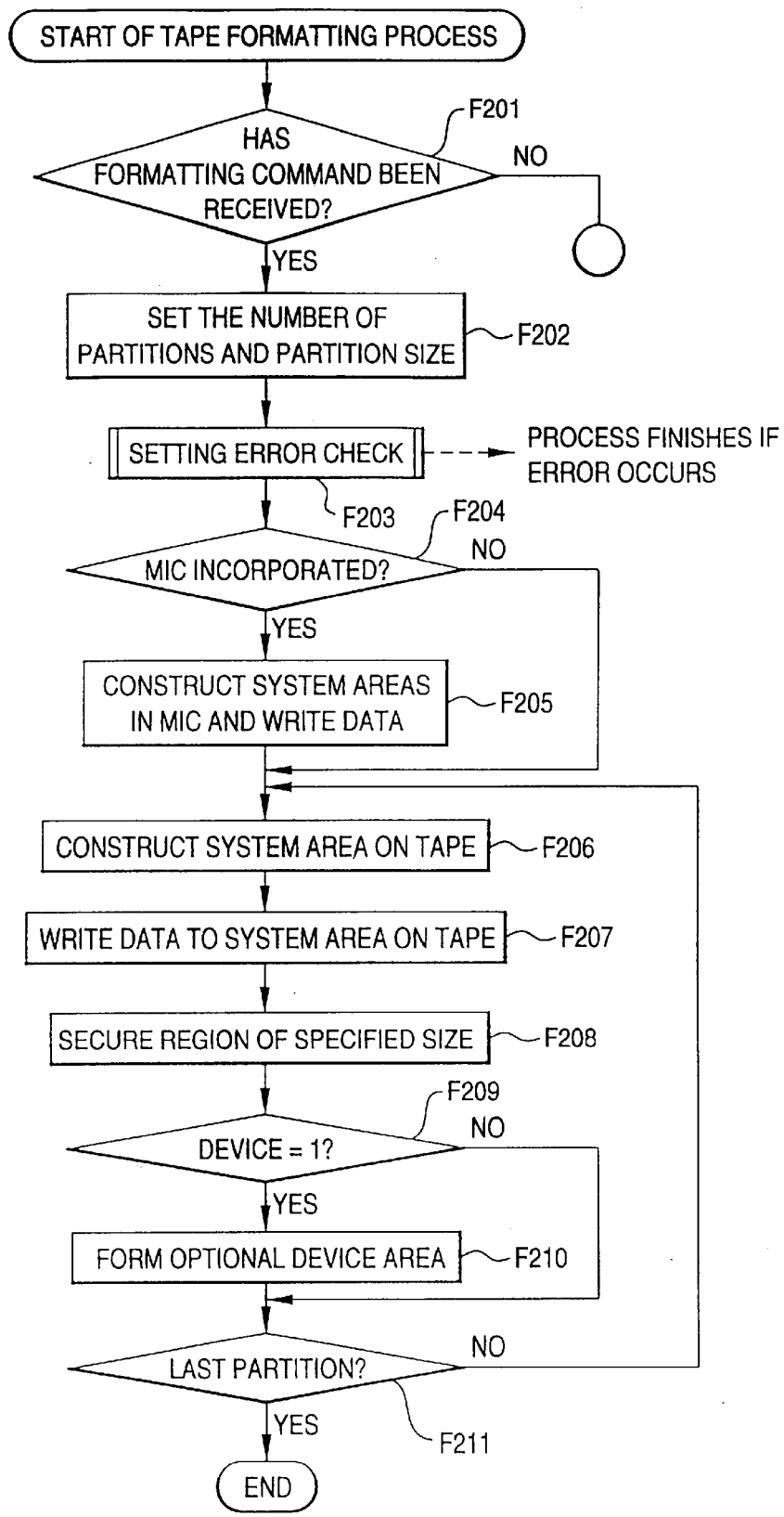
FIG. 19 is a flowchart showing a tape formatting process according to the embodiment.

FIG. 19 shows a process that is executed by the system controller 15 when a formatting command as described above is issued.

When a formatting command is received via the SCSI interface 20, the process of the system controller 15 goes from step F201 to step F202. At step F202, the system controller 15 sets the number of partitions to be formed by tape formatting and the size of each partition in accordance with the contents of the formatting command.

Then, the substantial formatting operation is started in accordance with the mode information that is held currently by the work memory 24. First, at step F203, a setting error check is performed to check whether the contents of the mode information are suitable for the tape cassette 1 that is currently mounted. This is a step for judging whether proper mode information is set based on whether the mode information is one of items ①–④ shown in FIG. 16 and whether the mounted tape cassette 1 has an MIC.

A detailed example of step F203 will be described with reference to FIG. 20.

First, at step F301, the AIT bit of the mode information stored in the work memory 24 is checked. If "AIT" is "1," which indicates a multi-partition mode, the process goes to step F302, where the device bit is checked. As seen from FIG. 16, the value of "device" should be "1" when "AIT" is "1." If "device" is "0" at step F301, a judgment "improper setting," that is, "occurrence of an error," is made.

If "device" is "1" at step F302, the process goes to step F303, where it is judged whether the mounted tape cassette 1 has an MIC. A multi-partition mode should not be set if the tape cassette 1 does not have an MIC. Therefore, if the tape cassette 1 does not have an MIC, a judgment "occurrence of an error" is made.

If it is confirmed that the tape cassette 1 has an MIC, the process goes to step F304, where the ABS bit of the mode information is checked. As seen from FIG. 16, "ABS" should be "1" in this case. Therefore, if "ABS" is "0," a judgment "occurrence of an error" is made.

If "ABS" is "1" at step F304, the process goes to step F305, where "sys log alive" is checked. If "sys log alive" is "00," a judgment "occurrence of an error" is made.

If "sys log alive" is "11," the process goes to step F306, where the reserved bits are checked. If the reserved bits are not "00," a judgment "occurrence of an error" is made. If the reserved bits are "00," the process goes to step F204 with a judgment "proper setting." That is, in this case, it is judged that multi-partition mode formatting with the conditions of item ① or ④ shown in FIG. 16 can be performed on the tape cassette 1 having the MIC 4, and the process moves to the substantial formatting operation.

On the other hand, if the AIT b it of the mode information stored in the work memory 24 is "0" at step F301, which indicates a normal mode, the process goes to step F307, where the device bit is checked. As seen from FIG. 16, "device" should be "0" if "AIT" is "0." Therefore, if "device" is "1" at step F307, a judgment "improper setting," that is, "occurrence of an error," is made.

If "device" is "0" at step F307, the process goes to step F308, where "ULPBOT" is checked. I n this case, "ULPBOT" should be "1." Therefore, if "ULPBOT" is "0," a judgment "occurrence of an error" is made.

If "ULPBOT" is "1" at step F308, the process goes to step F309, where the process is branched depending on whether the mounted tape cassette 1 has an MIC.

If the tape cassette 1 does not have an MIC, the setting should be in the state of item ① shown in FIG. 16. Therefore, in this case, "ABS," "sys log alive," and the reserved bits are checked at steps F313, F314, and F315, respectively. Only if "ABS" is "0," "sys log alive" is "00," and the reserved bits is "00," the process goes to step F204 with a judgment "proper setting." In this case, it is judged that normal mode formatting can be performed on the tape cassette 1 not having an MIC with the conditions of item ① shown in FIG. 16, and the process moves to the substantial formatting operation. If any of the conditions "ABS"="0," "sys log alive"="00," and (reserved bits)="00" is not satisfied at step F313, F314, or F315, a judgment "occurrence of an error" is made.

If it is judged at step F309 that the mounted tape cassette 1 has an MIC, "ABS," "sys log alive," and the reserved bits are checked at steps F310, F311, and F312, respectively. Only if "ABS" is "1," "sys log alive" is "11," and the reserved bits are "00," the process goes to step F204 with a judgment "proper setting." In this case, it is judged that normal mode formatting can be performed on the tape cassette 1 having the MIC 4 with the conditions of item ② shown in FIG. 16, and the process moves to the substantial formatting operation. If any of the conditions "ABS"="1," "sys log alive"="11," and (reserved bits)="00" is not satisfied at step F310, F311, or F312, a judgment "occurrence of an error" is made.

Figure 20:
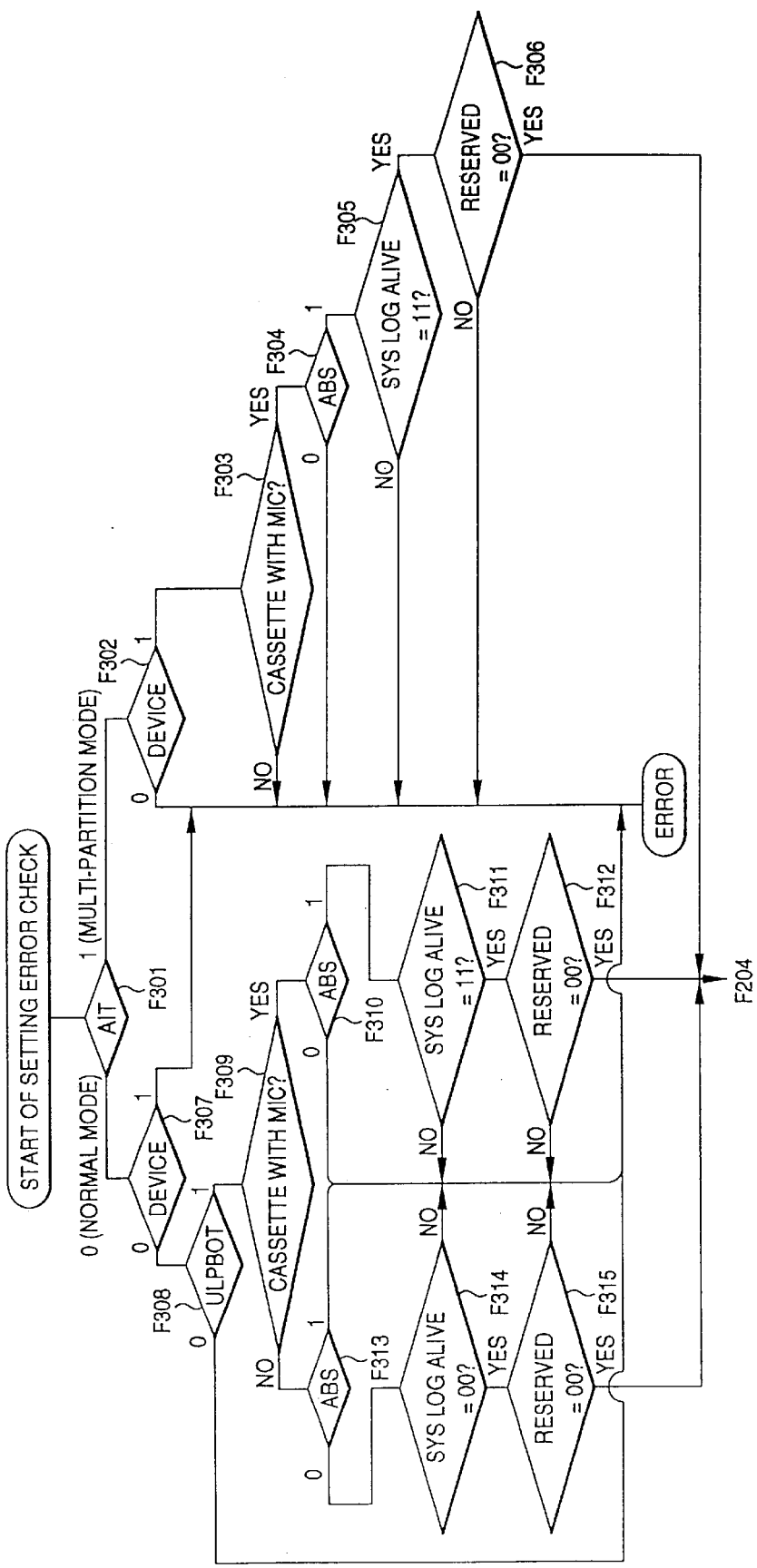
FIG. 20 is flowchart showing a setting error check step according to the embodiment.

In the above manner, the setting error check is performed according the process of FIG. 20 before performing the substantial tape formatting operation. If a judgment "occurrence of an error" is made, the execution of the process of FIG. 19 is stopped at step F203.

If the process goes to step F204 with a judgment "setting is proper," the substantial tape formatting operation is started. First, when the tape cassette 1 having the MIC 4 is mounted, that is, when the mode setting should be performed with the conditions of item ①, ③, or ④ shown in FIG. 16, the process goes to step F205, where formatting is performed on the MIC 4 of the tape cassette 1.

That is, system areas are constructed on the MIC 4 and the mode information is written there. Specifically, the data structure as shown in FIG. 12 is constructed and management information such as the volume information shown in FIG. 13 is written there. The AIT bit of the mode information stored in the work memory 24 corresponds to "DDS mode" shown in FIG. 13. "ULPBOT" and "sys log alive" themselves stored as part of the mode information are also written.

As for the partition information shown in FIG. 12, system log areas FL5a are constructed in accordance with the number of partitions that is indicated by the formatting command.

When the formatting on the MIC 4 at step F205 has finished (step F205 is skipped in the case where the tape cassette 1 does not have an MIC), the process goes to step F206 to start formatting on the magnetic tape 3. That is, the magnetic tape 3 is formatted to obtain the layout shown in one of FIGS. 7(A)–7(C). Specifically, areas are generated for the respective partitions in accordance with the specified mode and the number of partitions.

At step F206, a system area is constructed on the magnetic tape 3.

At step F207, data are written to the system area. That is, management information that is approximately the same as the management information that was written to the MIC 4 is recorded.

At step F208, a region of a partition is secured with a size that is specified by the formatting command.

At step F209, it is checked whether the device bit indicating whether to form an optional device area on the mode information is equal to "1." If the device bit is "1" (i.e., formatting of the multi-partition mode of item ③ or ④ shown in FIG. 16 should be performed), the process goes to step F210, where an optional device area is formed.

Steps F206–F210 are performed the number of times that is equal to the number of partitions specified by the formatting command. That is, steps F206–F210 are repeated until it is judged at step F211 that they have been executed for the last partition.

Therefore, when an instruction to form only one partition is made in the case of normal mode formatting, steps F206–F208 are executed once and a tape as shown in FIG. 7(A) is obtained. When an instruction to form two partitions is made in the case of normal mode formatting, steps F206–F208 are executed twice and a tape as shown in FIG. 7(B) is obtained.

In the case of multi-partition mode formatting, steps F206–F210 are repeated N times until all partitions (i.e., the specified number of partitions) are formed and a tape as shown in FIG. 7(C) is obtained.

In the above manner, the tape cassette 1 is formatted in the mode that is set by the mode setting command in accordance with the number of partitions and their size that are specified by a formatting command.

In a state that a mode has been set in each tape cassette 1 itself by the above-described formatting operation, in the case of a multi-partition mode, after a number of partitions are set, a recording/reproducing operation as well as loading/unloading can be performed on a partition-by-partition basis.

7. Tape Recognition

The above-described tape formatting causes a tape cassette 1 itself to have a mode. When mounted with such a tape cassette 1, the tape streamer drive performs operation setting in accordance with the mode of the tape cassette 1. That is, when a tape cassette 1 is mounted, the system controller 15 recognizes whether the mode of the tape cassette 1 is a normal mode or a multi-partition mode and performs operation setting in accordance with a recognition result.

Figure 21:
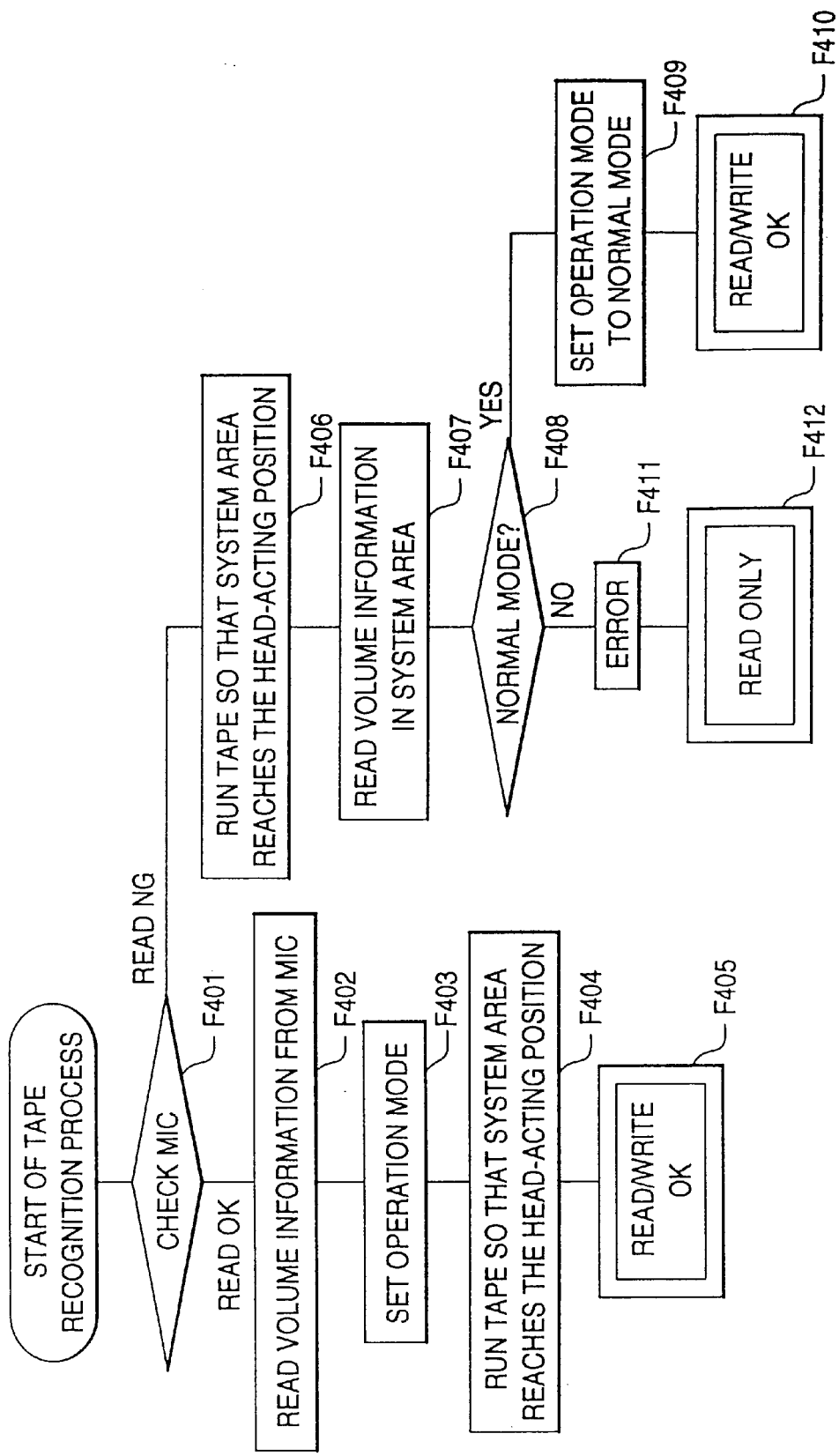
FIG. 21 is a flowchart showing a tape recognition process according to the embodiment.

FIG. 21 shows an example of such a tape recognition process.

First, when a tape cassette 1 is mounted, at step F401 the system controller 15 checks the MIC 4 of the tape cassette 1. That is, the system controller 15 performs a certain kind of access to the MIC 4 of the tape cassette 1 that has been connected by the mounting. For example, the MIC header is read out that was described above in connection with FIG. 12.

If the MIC header, for example, can be read out properly, it becomes known that the tape cassette 1 is of the type that incorporates an MIC 4 and it is judged that the MIC 4 functions properly.

In this is the case, the process goes to step F402, where the volume information of the MIC 4 is read out. At step F403, the mode that is set in the tape cassette 1 is judged based on the read-out information (the DDS mode bit etc. shown in FIG. 13) and the operation mode of the system controller 15 itself is set in accordance with the mode of the tape cassette 1. In this embodiment, the mode information of the work memory 24 is updated in accordance with the mode of the tape cassette 1.

Since in this case the mounted tape cassette 1 has an MIC 4, in the tape streamer device an operation mode is set in accordance with the normal mode of item ② shown in FIG. 16 or the multi-partition mode of item ③ or ④.

At step F404, the magnetic tape 3 is run so that a system area (see FIGS. 7(A)–7(C)) reaches the head-acting position. At step F405, a read/write enable state in the normal mode or the multi-partition mode is established.

If no information can be read out from the MIC 4 at step F401, it can be judged that the mounted tape cassette 1 is of the type that does not incorporate an MIC 4 or that the MIC 4 does not function properly because of a failure or some other reason.

In this case, the process goes to step F406, where the magnetic tape 3 is run so that a system area reaches the head-acting position. At step F407, the volume information in the system area is read out. As described above, approximately the same data of the volume information as in the MIC 4 are stored in the system areas on the magnetic tape 3. Therefore, the mode of the tape cassette 1 can be judged based on the read-out information (the DDS mode bit etc. shown in FIG. 14(A)).

If the mode of the tape cassette 1 is judged a normal mode, the process goes from step F408 to step F409, where the system controller 15 sets the operation mode to a normal mode. That is, the mode information in the work memory 24 is updated to the one corresponding to the normal mode of item ① shown in FIG. 16. At step F410, a read/write enable state in the normal mode is established.

If at step F408 the mode of the tape cassette 1 is judged a multi-partition mode, it can be judged that no information was read out at step F401 though the tape cassette 1 has an MIC 4. Therefore, at step F411, a mode error is set with a judgment that the MIC 4 does not function properly. At step F412, an operation mode of an MIC error state is set in which data can be read out from the magnetic tape 3 but cannot be written to it.

That is, since the state of the management information is improper because of an operation failure of the MIC 4 or may become improper when a write operation is performed, the state is established that at least the data stored in the magnetic tape 3 can be read out and disposal is left to the user.

As described above, the operation mode of the tape streamer drive is set in accordance with the mode that is set in a tape cassette 1 as a result of execution of the process that is to be executed upon mounting of a tape cassette 1.

Figure 22:
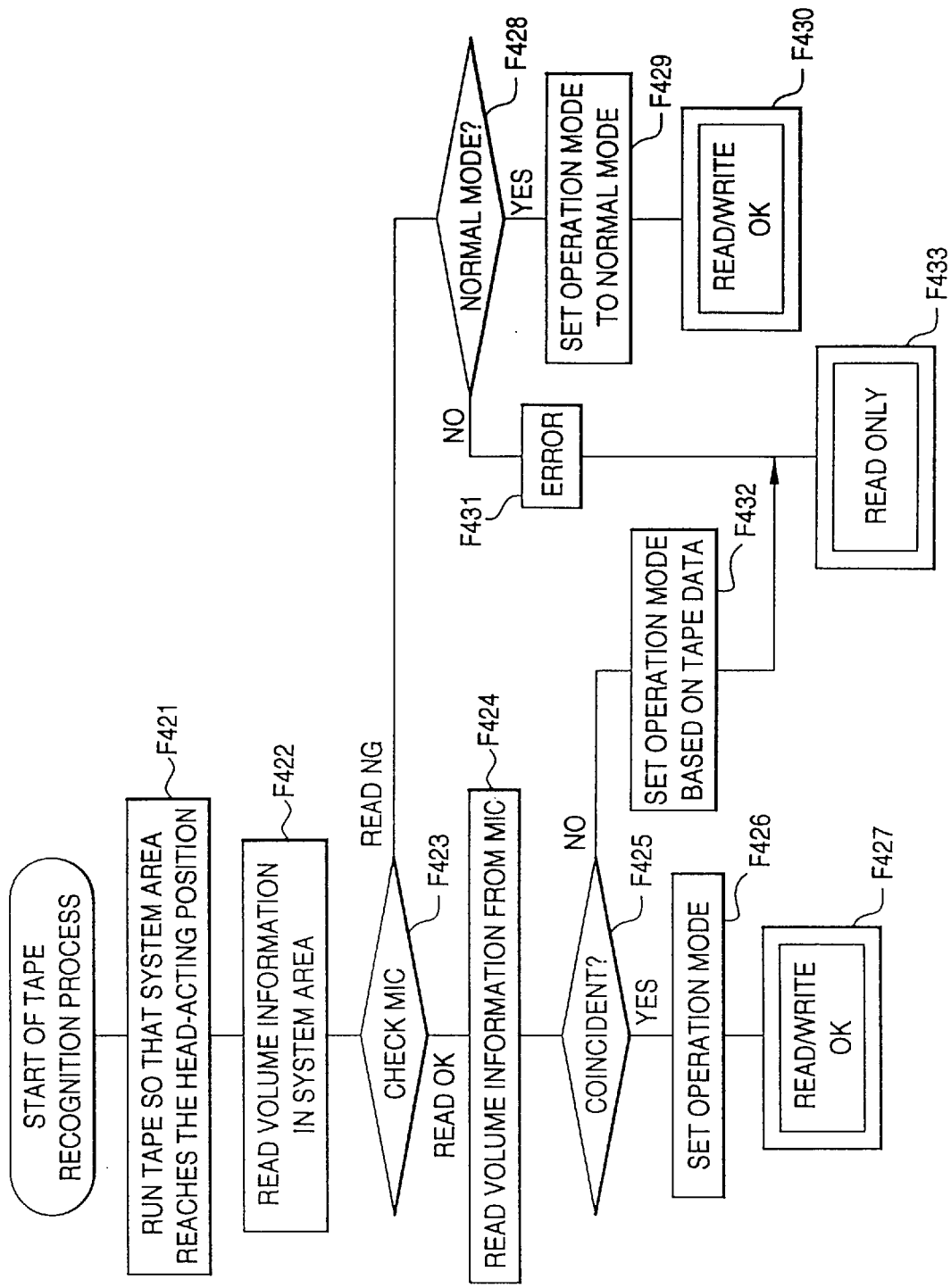
FIG. 22 is a flowchart showing another tape recognition process according to the embodiment.

FIG. 22 shows a modified process that is executed by the system controller 15 to set an operation mode when a tape cassette 1 is mounted.

In this modified process, as for the system areas of the MIC 4 and the magnetic tape 3 on which approximately the same management information is stored, priority is given to the information in the system areas of the magnetic tape 3.

When a tape cassette 1 is mounted, at step F421 the system controller 15 runs the magnetic tape 3 so that a system area reaches the head-acting position. At step F422, the volume information in the system area is read out. As mentioned above, the mode that is set in the tape cassette 1 can be judged based on the information (the DDS mode bit etc. shown in FIG. 14(A)) that is read out from the volume information in the system area on the magnetic tape 3.

At step F423, the system controller 15 checks the MIC 4 of the tape cassette 1. In this step, as in the case of step F401 of FIG. 21, the system controller 15 performs a certain kind of access to the MIC 4 of the tape cassette 1 that has been connected by the mounting.

If the MIC header, for example, can be read out properly, it becomes known that the tape cassette 1 is of the type that incorporates an MIC 4 and it is judged that the MIC 4 functions properly.

If this is the case, the process goes to step F424, where the volume information of the MIC 4 is read out. Naturally, the mode that is set in the tape cassette 1 can be judged based on the information (the DDS mode bit etc. shown in FIG. 13) that is read out at step F424.

Therefore, at step F425, it is checked whether the mode that was judged at step F422 based on the volume information that was read out from the system area of the magnetic tape 3 coincides with the mode that was judged at step F424 based on the volume information that was read from the MIC 4.

Their coincidence means a proper state. Therefore, if they coincide with each other, the process goes to step F426, where the operation mode of the system controller 15 itself is set in accordance with the coincident mode. That is, the mode information in the work memory 24 is updated in accordance with the mode of the tape cassette 1. Since in this case the mounted tape cassette 1 has an MIC 4 in the tape streamer drive, an operation mode is set in accordance with the normal mode of item ② shown in FIG. 16 or the multi-partition mode of item ③ or ④.

At step F427, a read/write enable state in the normal mode or the multi-partition mode is established.

If no information can be read out from the MIC 4 at step F423, it can be judged that the mounted tape cassette 1 is of the type that does not incorporate an MIC 4 or that the MIC 4 does not function properly because of a failure or some other reason.

In this case, the process goes to step F428, where it is judged whether the mode that was judged at step F422 based on the volume information in the system area on the magnetic tape 3 was a normal mode.

If the mode of the tape cassette 1 is judged a normal mode, the process goes from step F428 to step F429, where the system controller 15 sets its operation mode to a normal mode. That is, the mode information in the work memory 24 is updated to the one corresponding to the normal mode of item ① shown in FIG. 16. At step F430, a read/write enable state in the normal mode is established.

If at step F428 the mode of the tape cassette 1 is judged a multi-partition mode, it can be judged that no information was read out at step F423 though the tape cassette 1 has an MIC 4. Therefore, at step F431, a mode error is set with a judgment that the MIC 4 does not function properly. At step F433, an operation mode of an MIC error state is set in which data can be read out from the magnetic tape 3 but cannot be written to it.

That is, since the state of the management information is improper because of, for example, an operation failure of the MIC 4 or may become improper when a write operation is performed, the state is established that at least the data stored in the magnetic tape 3 can be read out and disposal is left to the user.

If it is judged at step F425 that the two modes do not coincide with each other, a judgment can be made that for some reason the management information on the magnetic tape 3 and that in the MIC 4 have some problem. Specifically, it is considered that a failure exists or data is damaged in the MIC 4.

In this case, priority is given to the volume information on the magnetic tape 3. That is, an operation mode is set at step F432 with the mode of the tape cassette 1 regarded as the one that was obtained by the judgment based on the information that was read out at step F422.

Even in this case, because of the defective state of the management information, it is not proper to permit normal operations. Therefore, the process goes to step F433, where the operation is so set as to enable data reading on the magnetic tape 3 but disable data writing on it. That is, also in this case, the state is established that at least the data stored in the magnetic tape 3 can be read out and disposal is left to the user.

According to the above process that is executed when a tape cassette 1 is mounted, the tape streamer drive sets an operation mode in accordance with a mode that is set in the tape cassette 1. In the case of the process shown in FIG. 22, it is checked whether the mode that is set on the magnetic tape 3 and the mode that is set in the MIC 4 coincide with each other, whereby the mode setting suitable for the tape cassette 1 can be performed more correctly on the tape streamer drive side.

8. Loading and Unloading at Partition

When the tape cassette 1 has an MIC 4 and a multi-partition mode (item ④ shown in FIG. 16) is set therein, loading and unloading on a partition-by-partition basis are enabled. That is, loading and unloading are possible not only at the tape top device area but also at the optional device areas of the respective partitions.

Figure 23:
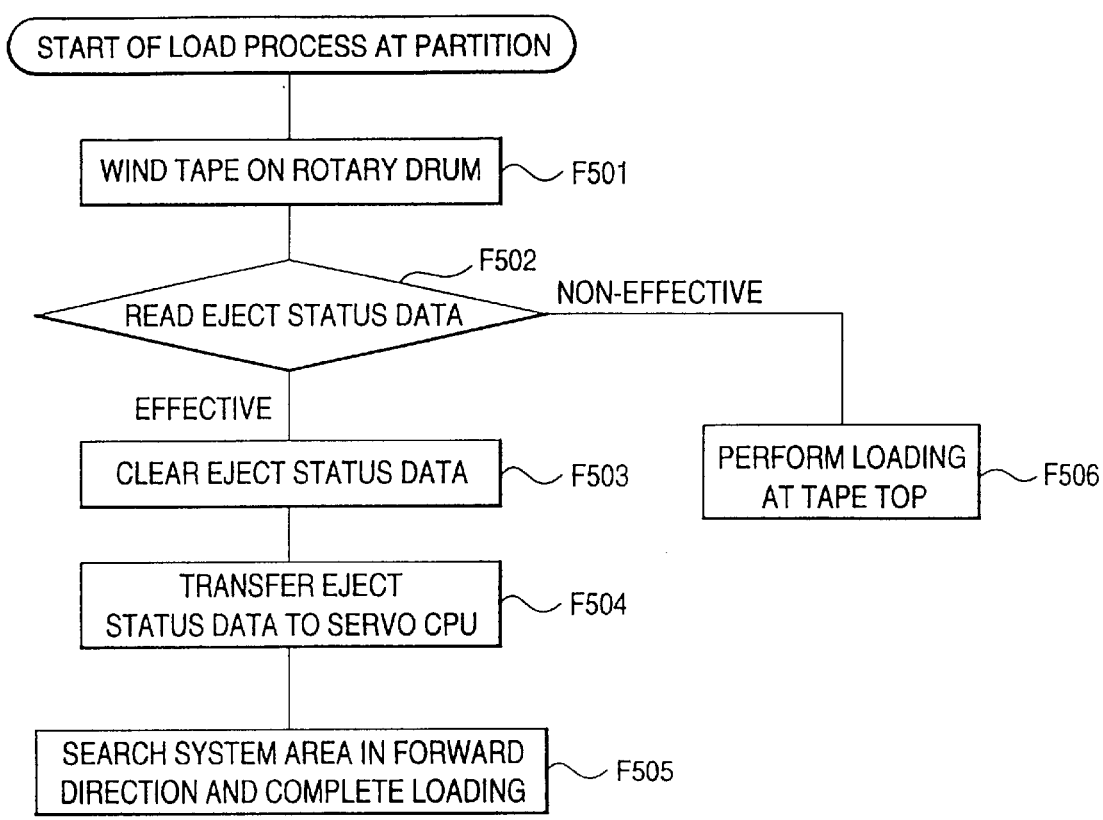
FIG. 23 is a flowchart showing a partition-by-partition load process according to the embodiment.
Figure 24:
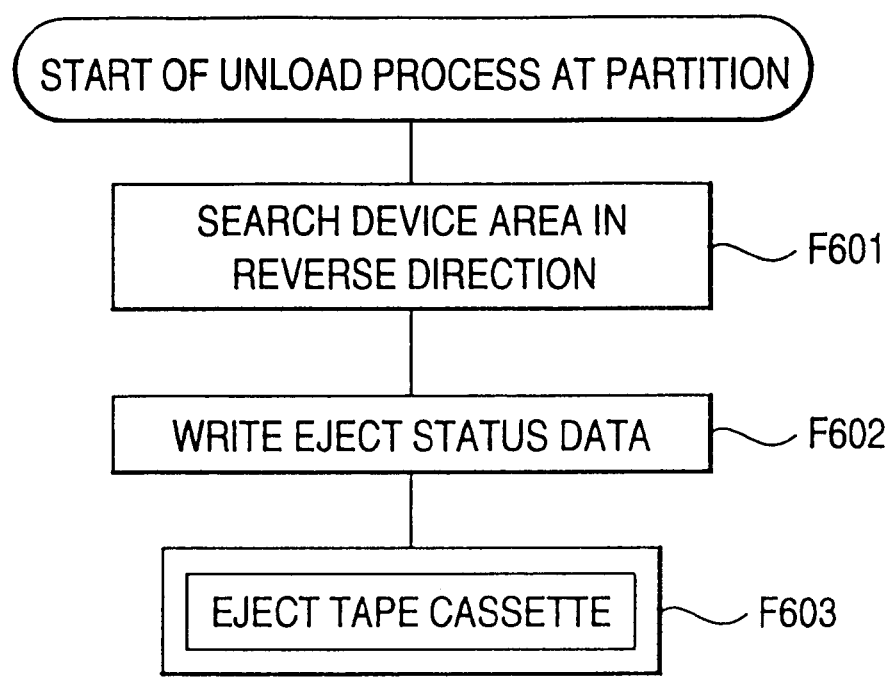
FIG. 24 is a flowchart showing a partition-by-partition unload process according to the embodiment.

FIGS. 23 and 24 show load and unload processes, respectively, that are executed on a multi-partition mode tape cassette 1 by the system controller 15.

First, the unload process shown in FIG. 24 will be described.

Assume a case of performing unloading in a state that a recording or reproducing operation has been performed on a partition on a magnetic tape 3 as shown in FIG. 7(C). For example, assume that recording or reproduction has been performed on partition #1 (in the following, a partition currently subjected to recording or reproduction will be called "active partition").

When unloading is performed, first, at step F601 shown in FIG. 24, the magnetic tape 3 is run in the reverse direction to search a device area (or an optional device area). The device area and the optional device area are areas that are set as a loading/unloading position.

For example, if partition #1 shown in FIG. 7(C) was active, the optional device area at the rear end of partition #0 should reach the head-acting position by the search of step F601.

When a device area or an optional device area reaches the head-acting position, at step F602 data of "eject status" (see FIG. 13) is written to the MIC 4. That is, the reel diameter information that is information of an unloading position is updated.

Then, at step F603, the tape cassette is ejected. For example, in the case of unloading in a state that partition #1, for example, was active, the tape cassette 1 is ejected at the optional device area immediately before partition #1 in a state that eject status information indicating that position is written to the MIC 4.

According to the above process, when a partition other than partition #0 was active, unloading is performed at an optional device area other than the tape top device area. That is, the tape cassette 1 is ejected without being rewound to the tape top.

For the above-described unload process, a load process is executed as shown in FIG. 23 when a tape cassette 1 is mounted.

First, at step F501, the magnetic tape 3 is drawn out of the mounted tape cassette 1 and wound on the rotary drum 11. At step F502, eject status data is read out from the MIC 4 and it is judged whether it is effective data. As described above in connection with the unload process shown in FIG. 24, eject status data is written at the time of unloading. Therefore, in the case of a tape cassette 1 that was previously subjected to unloading, effective eject status data indicating an unloading position should be read out from it.

If the tape position of the preceding ejection is recognized from the eject status data, the process goes to step F503, where the ejection status data in the MIC 4 is cleared. At step F504, the eject status data is transferred to the servo system (i.e., the controller of the tape running/drum rotation servo system that is not illustrated in FIG. 1). This enables the servo system to recognize the current tape position without the need for calculating a reel diameter, thereby increasing the efficiency of the operation.

At step F505, a system area is searched in the forward direction. When a system are a reaches the head-acting position, the loading is completed at that position.

In the above process, for example, when a tape cassette 1 that was ejected at the optional device area immediately before partition 1 shown in FIG. 7(C) is mounted, a system area is searched in the forward direction starting from that optional device area, whereby loading is completed at the system area of partition #1. That is, a loaded state having partition #1 as a target is established.

If no effective eject status data is read out at step F502, this means that the tape cassette 1 is one that is mounted first or a certain error has occurred. In this case, at step F506 loading is performed at the tape top. Specifically, the magnetic tape 3 is rewound to the tape top device area and then a system area is searched in the forward direction. When a system area reaches the head-acting position, loading is completed at that position. That is, in this case, loading is always performed at the system area of partition #0.

9. Append Partition

In the system of this embodiment, a partition can be appended to a tape cassette 1 of a multi-partition mode.

Appending of a partition to the mounted tape cassette 1 is performed based on an append partition command that is a SCSI command supplied from the host computer 25.

FIG. 25 shows a data structure of an append partition command.

"Page code" indicates that the command is an append partition command. "Page length" indicates the length (the number of bytes) of data contents that follow.

Various kinds of information are thereafter described as substantial data contents of the command. In particular, "partition size descriptor" is information that specifies the size of a partition to be appended.

Figure 26:
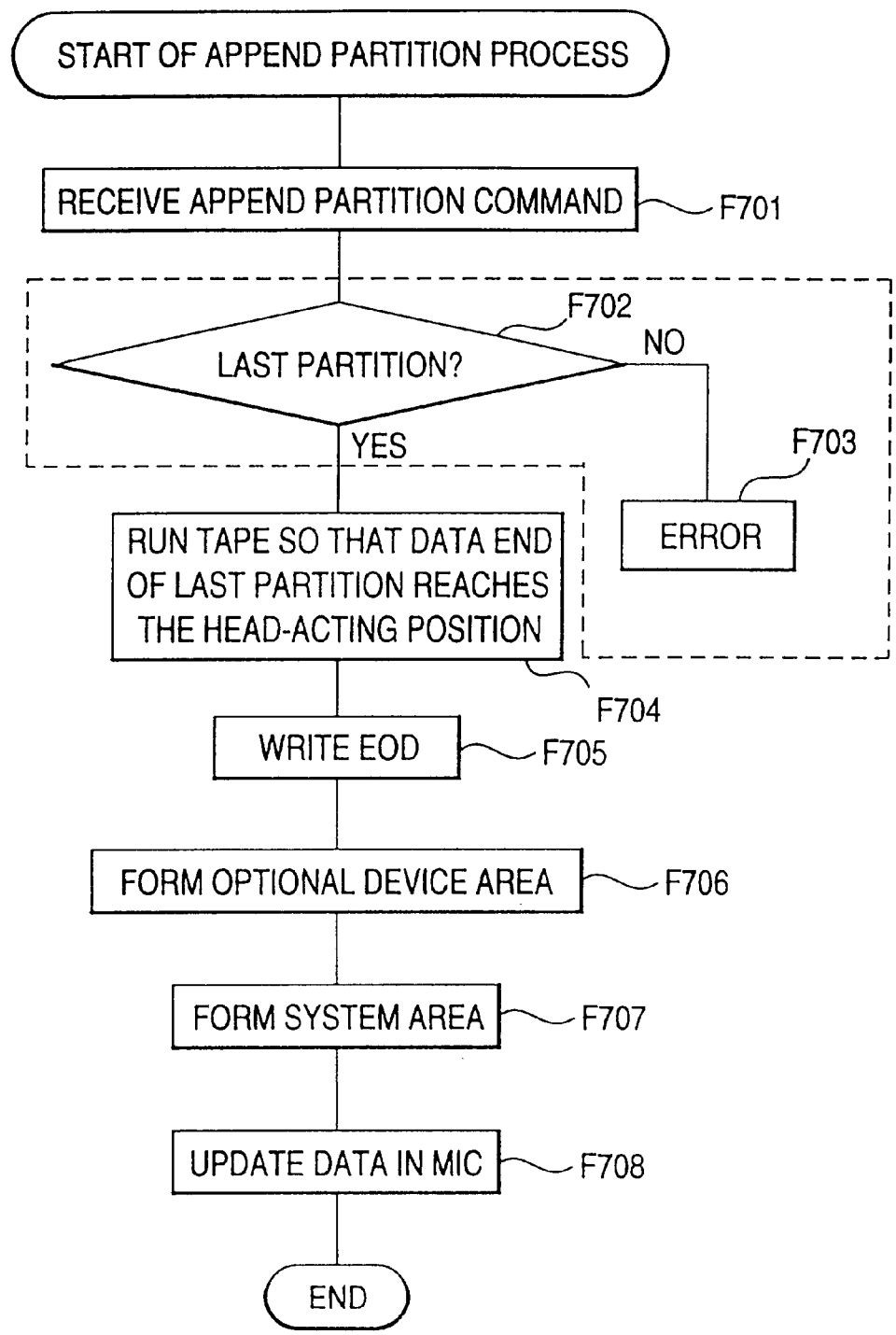
FIG. 26 is a flowchart showing an append partition process according to the embodiment.

FIG. 26 shows a process that is executed by the system controller 15 when an append partition command as described above is issued.

When an append partition command is received via the SCSI interface 20, at step F701 the system controller 15 captures it. At step F702, the system controller 15 judges whether the partition that is currently active is the last one of the partitions that currently exist on the tape cassette 1.

If the partition that is currently active is not the last partition, the process goes to step F703, where a judgment "error" is made. No partition is appended in this case.

Steps F702 and F703, which are enclosed by a broken line, are steps to allow partition appending only in the case that the last partition is active. These steps may be removed if designing circumstances and operation circumstances during use do not require such a restriction.

At step F704, the magnetic tape 4 is run so that the data end of the last partition reaches the head-acting position. At step F705, "EOD" (end of data) is recorded in a region of a capacity that is specified by the append partition command after the data end of the last partition, whereby a region of an additional partition is secured.

At step F706, an optional device area as the rear end of the so far last partition is formed (this step is executed only in a mode in which loading and unloading at an optional device area are permitted). At step F707, a system area of a new partition is formed.

As a result, a new partition is formed on the magnetic tape 3. At step F708, data in the MIC 4 is updated that should be done so because of the formation of the new partition. For example, "last partition number" of the volume information is updated and a system log area for the new partition is added.

According to the above process, a partition can be appended to a tape cassette 1 of a multi-partition mode.

10. Delete Partition

In the system of this embodiment, deletion of a partition can also be performed on a tape cassette 1 of a multi-partition mode.

Deletion of a partition from a tape cassette 1 is performed based on a delete partition command that is a SCSI command supplied from the host computer 25.

FIG. 27 shows a data structure of a delete partition command.

"Page code" indicates that the command is a delete partition command. "Page length" indicates the length (the number of bytes) of data contents that follow.

As for the substantial data contents of the command, "indicate partition number" indicates partitions to be deleted. That is, all partitions located after the partition having the number corresponding to "indicate partition number" should be deleted. In other words, "indicate partition number" corresponds to the number of the last one of the partitions to be left.

Figure 28:
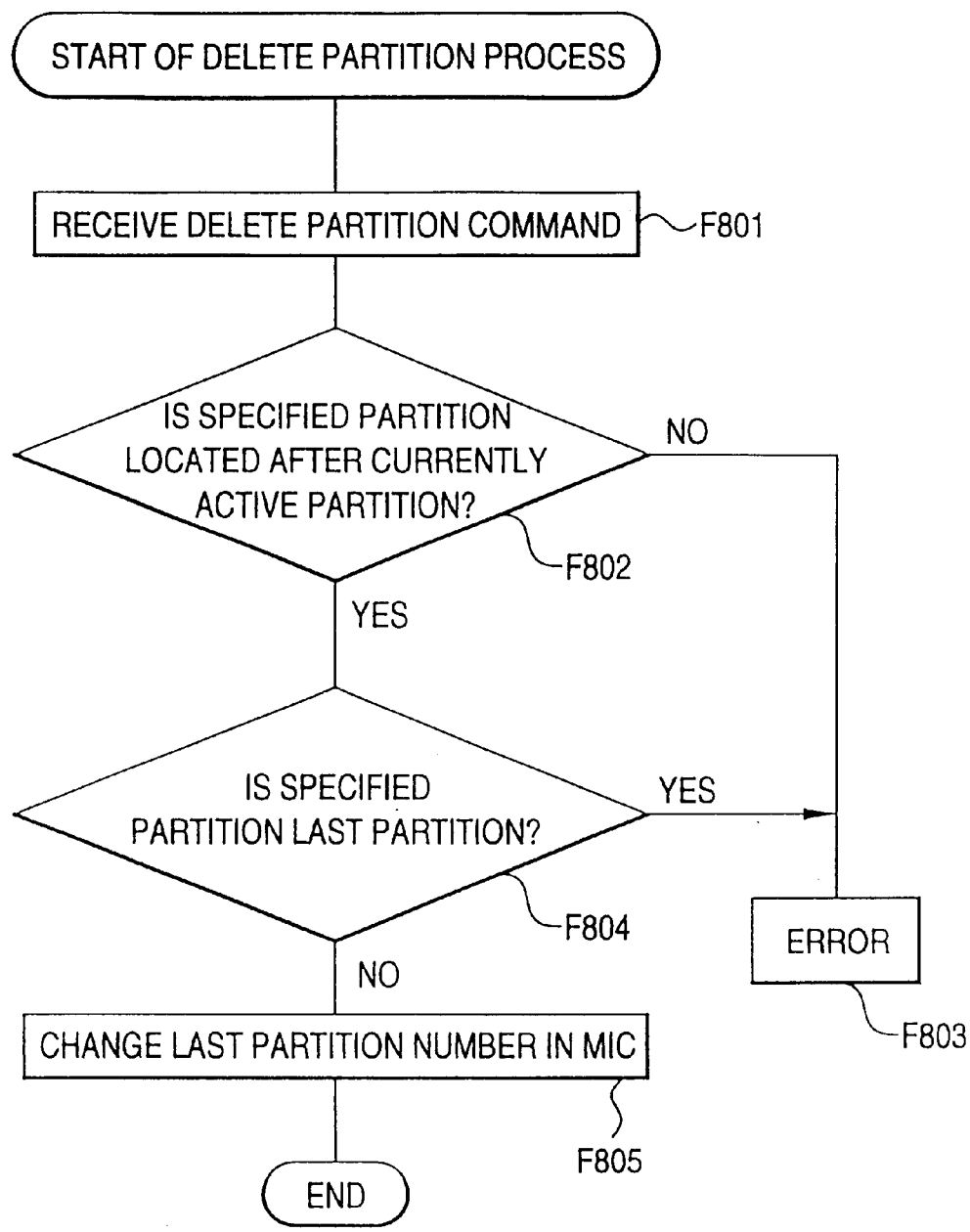
FIG. 28 is a flowchart of a delete partition process according to the embodiment.

FIG. 28 shows a process that is executed by the system controller 15 when a delete partition command as described above is issued.

When a delete partition command is received via the SCSI interface 20, at step F801 the system controller 15 captures it. At step F802, the system controller 15 judges whether the partition corresponding to "indicate partition number" of the delete partition command is currently active or is located after the currently active partition.

If the specified partition number is smaller than the number of the currently active partition, the process goes to step F803, where a judgment "error" is made. No partition is deleted in this case.

Steps F802 and F803 are steps to allow deletion of only partitions that are located after a currently active partition.

If the partition number specified by the delete partition command corresponds to the currently active partition or a partition located after it, the process goes to step F804, where it is judged whether the partition corresponding to "indicate partition number" is the last one of the partitions that exist currently. If it is the last one, a judgment "error" is made at step F803 because there is no partition to be deleted.

If it is judged at step F804 that the partition corresponding to "indicate partition number" is not the last one, the process goes to step F805, where data of the MIC 4 is updated to perform partition deletion. That is, the management information is updated so as to represent a state that the partitions after the partition of the specified number are deleted. For example, the last partition number of the volume information in the MIC 4 is changed and the system log area of one or a plurality of deleted partitions is invalidated.

The execution of the above process of updating the management information in the MIC 4 means that the partitions on the magnetic tape 3 have been deleted.

Example operations of the partition deletion will be described with reference to schematic diagrams of FIGS. 29–34.

Figure 29:
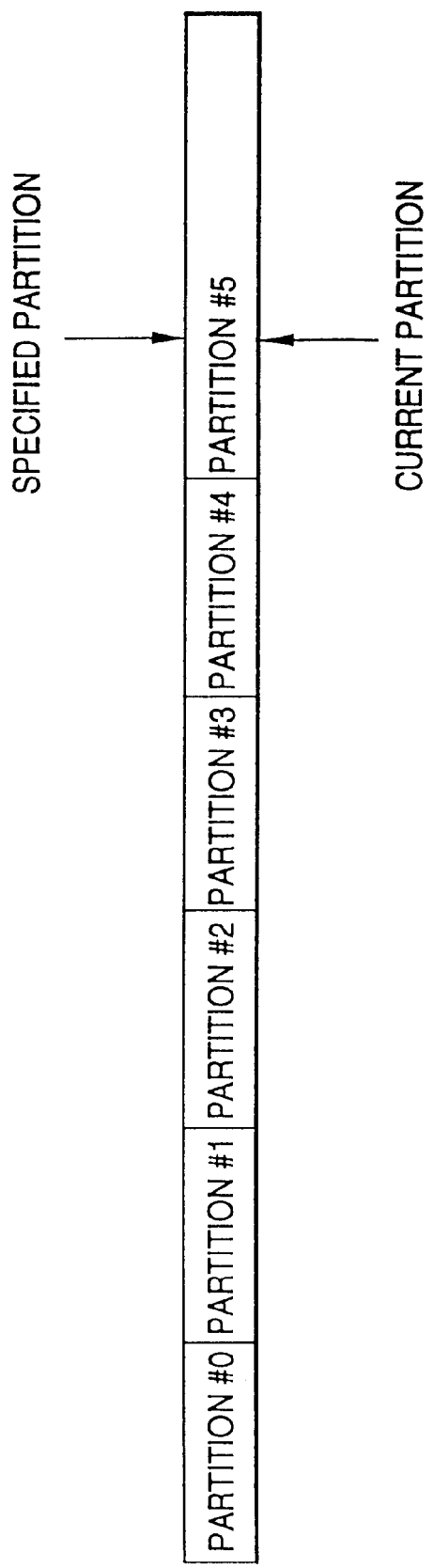
Figure 30:
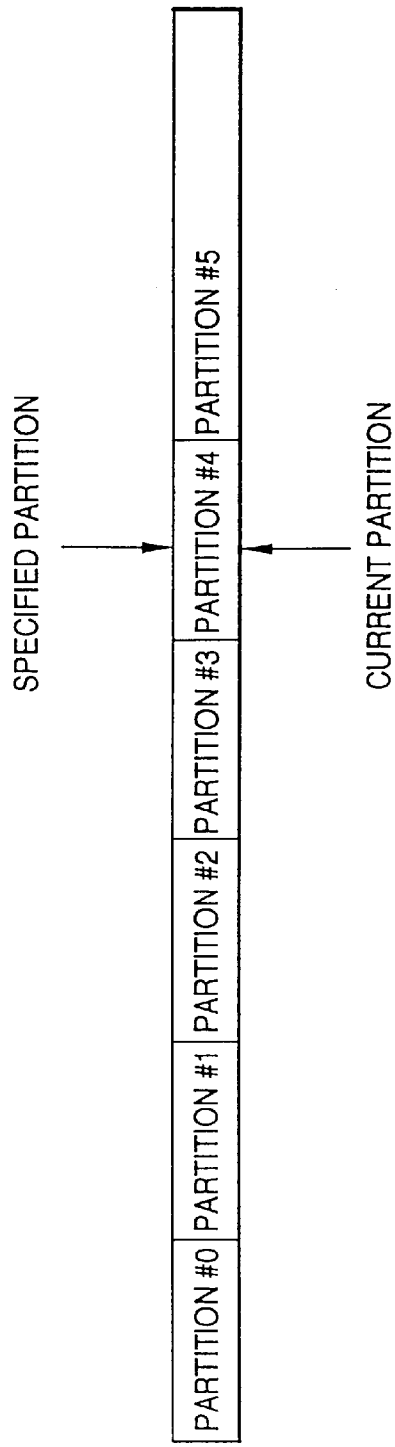
Figure 30:
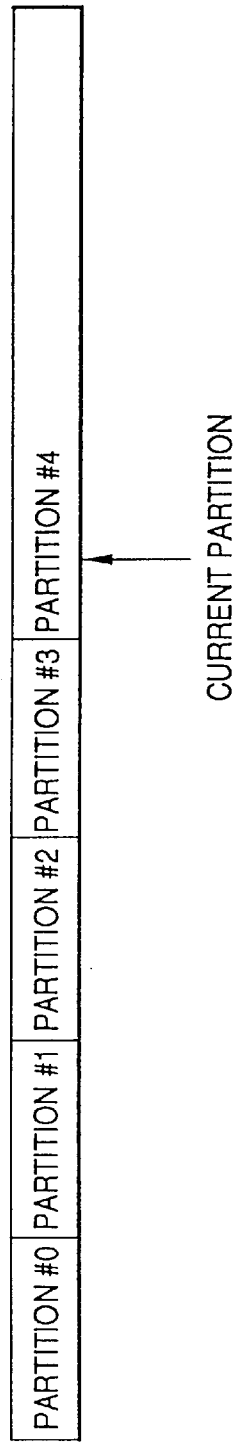
Figure 32:
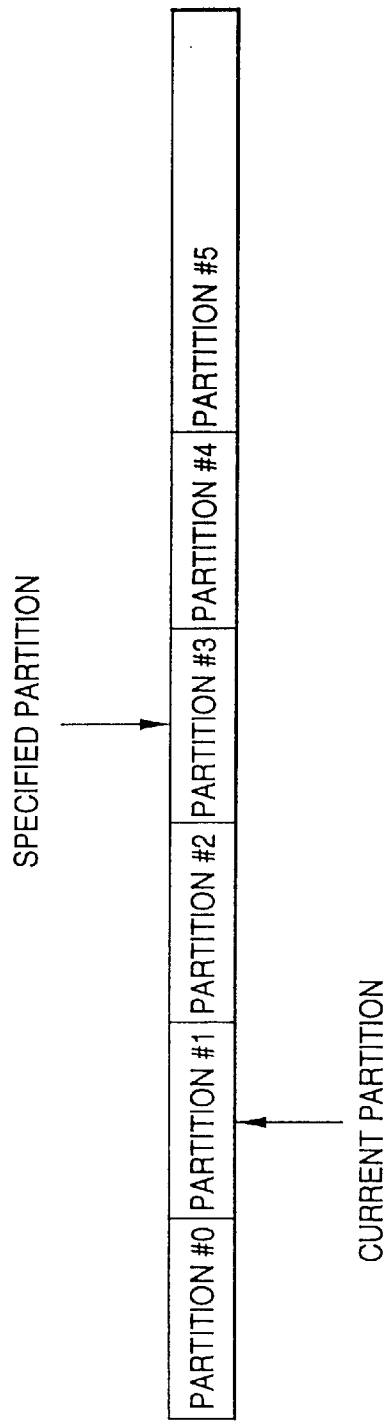
Figure 32:
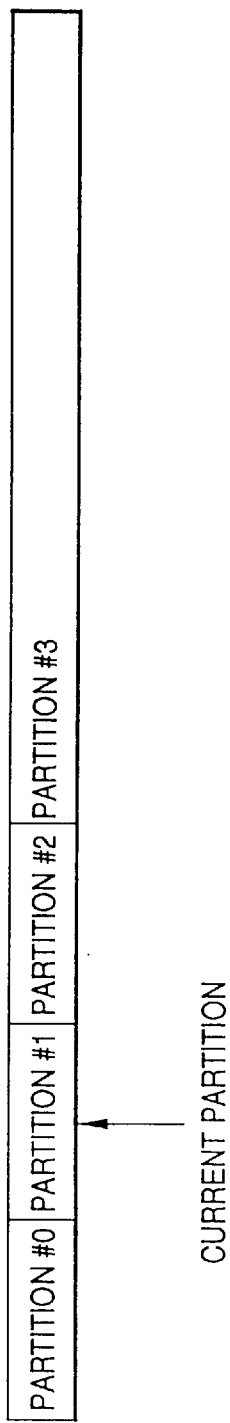

FIG. 29 shows a case where "indicate partition number" of a delete partition command corresponds to partition #5 that is the last partition and currently active.

In this case, the process of FIG. 28 goes from step F802 to step F804. For this delete partition command, a judgment "error" is made at step F804 because the last partition is specified. That is, partition deletion is not performed.

FIG. 30(A) shows a case where "indicate partition number" of a delete partition command corresponds to partition #4 in a state that partition #0 to #5 exist and partition #4 is active.

In this case, the command instructs the tape streamer drive to delete the partition after partition #4 and is a valid one. The process goes to step F805, where the management information in the MIC 4 is updated, whereby a state is established that partition #5 is deleted as shown in FIG. 30(B).

FIG. 31(A) shows a case where "indicate partition number" of a delete partition command corresponds to partition #0 in a state that partitions #0 to #5 exist and partition #0 is active.

In this case, the command instructs the tape streamer drive to delete the partitions after partition #0 and is a valid one. The process goes to step F805, where the management information in the MIC 4 is updated, whereby a state is established that partitions #1 to #5 are deleted as shown in FIG. 31(B).

FIG. 32(A) shows a case where "indicate partition number" of a delete partition command corresponds to partition #3 in a state that partitions #0 to #5 exist and partition #1 is active.

In this case, the command instructs the tape streamer drive to delete the partitions after partition #3 and is a valid one. The process goes to step F805, where the management information in the MIC 4 is updated, whereby a state is established that partitions #4 and #5 are deleted as shown in FIG. 32(B).

Figure 33:
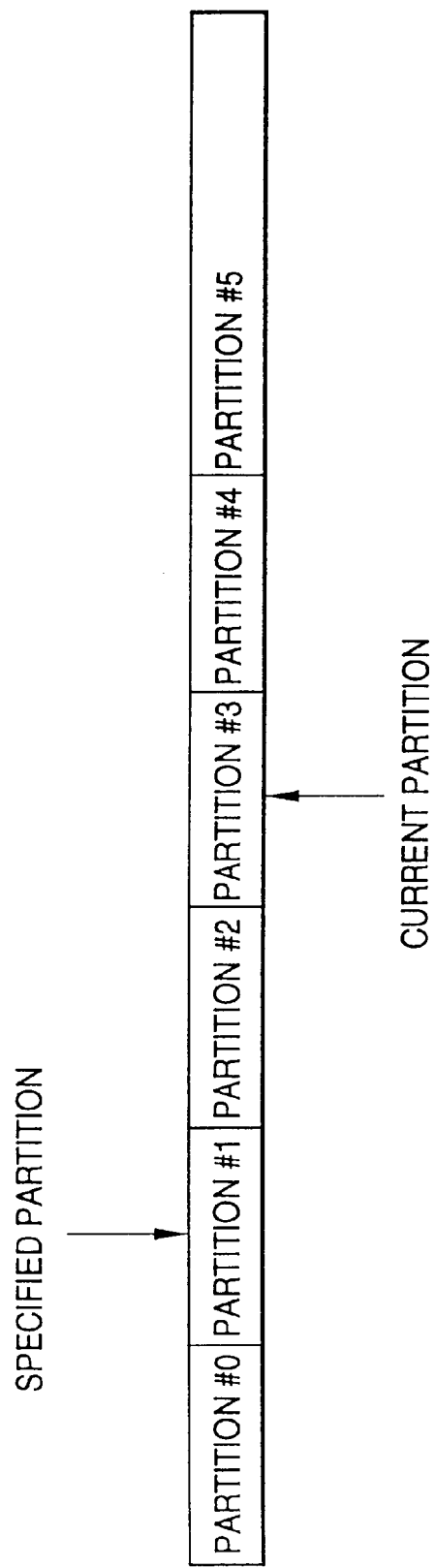

FIG. 33 shows a case where "indicate partition number" of a delete partition command corresponds to partition #1 in a state that partitions #0 to #5 exist and partition #3 is active.

In this case, the judgment result at step F802 is negative and hence a judgment "error" is made at step F804. Therefore, partition deletion is not performed.

Figure 34:
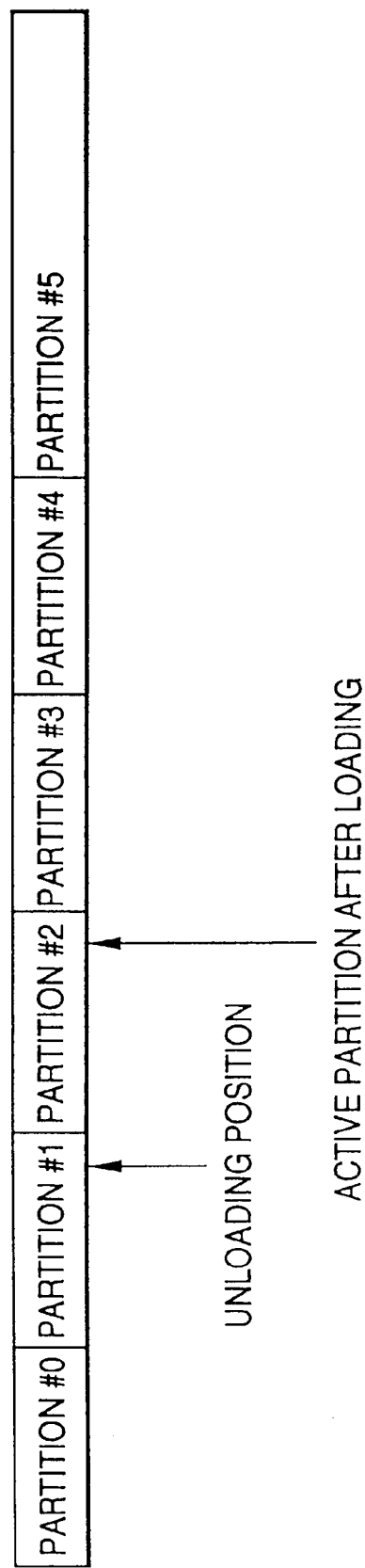

FIG. 34 shows a case where a delete partition command is issued in a state that the tape streamer drive is not mounted with any tape cassette 1 (no magnetic tape 3 is wound on the rotary drum 11). The tape position in an unloaded state is the optional device area at the rear end of partition #1. As seen from the process shown in FIG. 23, subsequent loading is completed at the system area of partition #2. That is, partition #2 is rendered active at the time of completion of the loading.

Therefore, in this case, if "indicate partition number" of the delete partition command corresponds to any of partitions #2 to #4, the command is judged valid and partition deletion is performed. On the other hand, if it corresponds to any of partitions #0, #1, and #5, the command is judged invalid and hence partition deletion is not performed.

Although the embodiment of the invention has been described above, the invention is not limited to the configurations and operations illustrated by the drawings; the formats of data to be stored in the tape cassette, the tape streamer drive, and the MIC, the related operations, etc. can be modified when necessary in accordance with actual use conditions etc.

The above-described embodiment is directed to the recording/reproduction system that performs recording and reproduction of a digital signal and consists of the 8 mm VTR tape cassette having a nonvolatile memory and the tape streamer drive corresponding to such a tape cassette. However, the invention is not limited to such a case and can also be applied, for example, to recording/reproduction systems capable of recording and reproducing information of a digital video or audio signal.

As described above, in the tape drive apparatus of the invention, when a tape cassette is mounted, whether the tape cassette is of a first mode (normal mode) or a second mode (muti-partition mode) is judged based on one or both of management information that is read out from the magnetic tape and management information that is read out from the memory (MIC) in the tape cassette, and operation setting is performed in accordance with the mode thus judged.

This provides an advantage that operations can be performed properly in accordance with the mode that is set in the tape cassette itself.

As for the above mode judgment, if management information is read out from the memory, the mode of the tape cassette is judged based on the read-out management information and operation setting is performed in accordance with the mode thus judged. If management information is not read out from the memory because of absence of a memory (MIC), management information on the magnetic tape is read out and, if it is recognized that the tape cassette is of the first mode based on the read-out management information, operation setting is performed for the tape cassette in accordance with the first mode. This enables proper setting to be performed in accordance with the type of tape cassette (presence/absence of an MIC) and a mode set therein.

In the case where management information is not read out from the memory, if the management information that is read out from the magnetic tape indicates that the tape cassette is of the second mode, a mode error operation is performed because the situation is improper.

As for the mode judgment, alternatively, both of management information of the magnetic tape and that of the memory are read out when the tape cassette is mounted. If the two pieces of management information coincide with each other, whether the cassette tape is of the first mode or the second mode is judged based on the management information and operation setting is performed in accordance with the mode thus judged. This enables an operation mode to be set more correctly.

If management information is not read out from the memory, operation setting is performed for the tape cassette in accordance with the first mode after it is recognized that the tape cassette is of the first mode based on the management information read out from the magnetic tape. This makes it possible to support a tape cassette not having an MIC.

Further, in the case where management information is not read out from the memory, if the management information that is read out from the magnetic tape indicates that the tape cassette is of the second mode , a mode error operation is performed because the situation is improper. If the management information of the magnetic tape does not coincide with the management information of the memory, it is judged that an error exists in the memory (MIC) and an operation mode is set based on a mode that is indicated by the management information of the magnetic tape.

According to another aspect of the invention, when the receiving means receives a formatting command from a host apparatus, a tape cassette of a first mode or a second mode is obtained by causing one or both of the tape driving means and the memory driving means to write management information by a using mode information stored in the storing means. Therefore, a tape cassette of a desired mode can be obtained.

Mode information is written to the storing means or the mode information stored in the storing means is updated in accordance with a mode setting command supplied from the host apparatus. For example, this enables mode setting for subsequent formatting.

If the mode information is not suitable for the mounted tape cassette in performing tape formatting by using the mode information stored in the storing means, an error operation is performed. This prevents improper formatting.

What is claimed is:

1. A tape drive apparatus comprising:

tape driving means for recording or reproducing information on or from a magnetic tape when a tape cassette incorporating the magnetic tape is mounted into the tape drive apparatus;

memory driving means for reading or writing management information from or to a memory included in the tape cassette for storing the management information to be used for managing recording and reproduction on the magnetic tape; and control means for judging, when the tape cassette is mounted, whether the tape cassette is of a first operational mode or a second operational mode based on at least one of first management information read out from the magnetic tape by the tape driving means and second management information that is read out from the memory by the memory driving means, and for performing an operational setting of the tape driving means in accordance with the first operational mode or the second operational mode thus judged, wherein when the management information is read out by the memory driving means when the tape cassette is mounted, the control means judges whether the tape cassette is of the first operational mode or the second operational mode based on one of the first and second management information read out by the memory driving means and performs an operational setting of the tape driving means in accordance with the mode thus judged; and when the second management information is not read out by the memory driving means, the control means causes the tape driving means to read out the first management information on the magnetic tape and, when the control means judges that the tape cassette is of the first mode based on the read-out management information, performs the operational setting of the tape driving means for the tape cassette in accordance with the first mode, and wherein in the case where the second management information is not read out by the memory driving means, and the first management information that is read out from the magnetic tape by the tape driving means indicates that the tape cassette is of the second mode, the control means performs a mode error operation.

2. A tape drive apparatus comprising:

tape driving means for recording or reproducing information on or from a magnetic tape when a tape cassette incorporating the magnetic tape is mounted into the tape drive apparatus;

memory driving means for reading or writing management information from or to a memory included in the tape cassette for storing the management information to be used for managing recording and reproduction on the magnetic tape; and control means for judging, when the tape cassette is mounted, whether the tape cassette is of a first operational mode or a second operational mode based on at least one of first management information read out from the magnetic tape by the tape driving means and second management information that is read out from the memory by the memory driving means, and for performing an operational setting of the tape driving means in accordance with the first operational mode or the second operational mode thus judged, when the tape cassette is mounted, the control means causes the tape driving means and the memory driving means to read out the first and second management information from the magnetic tape and the memory, respectively; and when the management information read out by the tape driving means coincides with the management information read out by the memory driving means, the control means judges whether the tape cassette is of the first mode or the second mode based on the management information and performs an operational setting of the tape drive means in accordance with the mode thus judged, and when the second management information is not read out by the memory driving means, the control means performs an operational setting for the tape cassette in accordance with the first mode after judging that the tape cassette is of the first mode based on the management information read out by the tape driving means, and wherein in the case where second management information is not read out by the memory driving means, when the first management information that is read out from the magnetic tape by the tape driving means indicates that the tape cassette is of the second mode, the control means performs a mode error operation.

3. The tape drive apparatus according to claim 2, wherein if the first management information read out by the tape driving means does not coincide with the second management information read out by the memory driving means, the control means judges a mode of the tape cassette based on the first management information read out by the tape driving means and performs an operational setting in accordance with the mode thus judged.

4. A tape drive apparatus comprising:

tape driving means for recording or reproducing information on or from a magnetic tape when a tape cassette incorporating the magnetic tape is mounted into the tape drive apparatus;

memory driving means for reading or writing management information from or to a memory included in the tape cassette for storing management information to be used for managing recording and reproduction on the magnetic tape; and control means for judging, when the tape cassette is mounted, whether the tape cassette is of a first operational mode or a second operational mode based on at least one of first management information read out from the magnetic tape by the tape driving means and second management information that is read out from the memory by the memory driving means, and for performing an operational setting of the tape driving means in accordance with the first operational mode or the second operational mode thus judged, wherein the first mode is a mode of using a magnetic tape in which one or two partitions on the magnetic tape are set, and the second mode is a mode of using a magnetic tape in which three or more partitions on the magnetic tape are set.

5. A tape drive apparatus for use in a host apparatus comprising:

tape driving means for recording or reproducing information on or from a magnetic tape when a tape cassette incorporating the magnetic tape is mounted into the tape drive apparatus;

memory driving means for reading or writing management information from or to a memory in the tape cassette for storing management information to be used for management of the recording and reproducing of information on the magnetic tape;

storing means for storing mode information relating to the tape cassette;

receiving means for receiving a command from the host apparatus; and control means for setting the tape cassette to one of a first mode and a second mode by causing at least one of the tape driving means and the memory driving means to write management information by using the mode information stored in the storing means when the receiving means receives a formatting command from the host apparatus, wherein when the mode information is not suitable to cause one or both of the tape driving means and the memory driving means to write management information by using the mode information stored in the storing means, the control means performs an error operation.

6. The tape drive apparatus according to claim 5, wherein when the receiving means receives a mode setting command, the control means performs one of writing mode information to the storing means and updating the mode information stored in the storing means in accordance with the mode setting command.

7. A tape drive apparatus for use in a host apparatus comprising:

tape driving means for recording or reproducing information on or from a magnetic tape when a tape cassette incorporating the magnetic tape is mounted into the tape drive apparatus;

memory driving means for reading or writing management information from or to a memory in the tape cassette for storing management information to be used for management of the recording and reproducing of information on the magnetic tape;

storing means for storing mode information relating to the tape cassette;

receiving means for receiving a command from the host apparatus; and control means for setting the tape cassette to one of a first mode and a second mode by causing at least one of the tape driving means and the memory driving means to write management information by using the mode information stored in the storing means when the receiving means receives a formatting command from the host apparatus, wherein the first mode is a mode of using a magnetic tape in which one or two partitions on the magnetic tape are set, and the second mode is a mode of using a magnetic tape in which three or more partitions on the magnetic tape are set.

* * * * *